(12) United States Patent
Saruta et al.

(10) Patent No.: US 11,334,759 B2
(45) Date of Patent: May 17, 2022

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventors: Takayuki Saruta, Tokyo (JP); Koichi Takeuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 16/752,014

(22) Filed: Jan. 24, 2020

(65) Prior Publication Data

US 2020/0250471 A1 Aug. 6, 2020

(30) Foreign Application Priority Data

Jan. 31, 2019 (JP) .............................. JP2019-015982

(51) Int. Cl.
| | |
|---|---|
| *G06K 9/62* | (2022.01) |
| *G06V 40/10* | (2022.01) |
| *G06V 10/82* | (2022.01) |
| *G06V 20/52* | (2022.01) |

(52) U.S. Cl.
CPC ........... *G06K 9/6228* (2013.01); *G06K 9/628* (2013.01); *G06K 9/6263* (2013.01); *G06V 40/103* (2022.01)

(58) Field of Classification Search
None
See application file for complete search history.

(56) References Cited

U.S. PATENT DOCUMENTS

| | | | |
|---|---|---|---|
| 9,147,130 B2 | 9/2015 | Saruta et al. | |
| 9,245,199 B2 | 1/2016 | Saruta et al. | |
| 9,489,593 B2* | 11/2016 | Saruta ................. | G06K 9/6211 |
| 9,665,803 B2* | 5/2017 | Aoba ..................... | G06V 20/10 |
| 9,779,329 B2 | 10/2017 | Saruta | |
| 2019/0304284 A1 | 10/2019 | Takeuchi et al. | |

FOREIGN PATENT DOCUMENTS

| | | | |
|---|---|---|---|
| CN | 108777777 A | * | 11/2018 |
| CN | 109829889 A | * | 5/2019 |
| CN | 109903268 A | * | 6/2019 |

(Continued)

OTHER PUBLICATIONS

Redmon, J. et al., "You Only Look Once: Unified, Real-Time Object Detection," International Conference on Computer Vision and Pattern Recognition, 2016, pp. 1-10.

(Continued)

*Primary Examiner* — Mohammed Rachedine
(74) *Attorney, Agent, or Firm* — Carter, DeLuca & Farrell LLP

(57) ABSTRACT

There is provided with an information processing apparatus. An acquisition unit acquires data. A detection unit detects a determination target from the data. A training unit performs training of a determiner for performing category determination concerning the determination target using information of the determination target detected by the detection unit and intermediate data being generated during detection processing by the detection unit and being different from the information of the determination target.

17 Claims, 21 Drawing Sheets

(56) References Cited

FOREIGN PATENT DOCUMENTS

JP 2011227614 A 11/2011
JP 2017091552 A 5/2017

OTHER PUBLICATIONS

Dalal, N. et al., "Histograms of Oriented Gradients for Human Detection," International Conference on Computer Vision and Pattern Recognition, 2005, pp. 1-8.
Kingma, D. P. et al. "Auto-Encoding Variational Bayes," ARXIV 2013, published May 1, 2014, pp. 1-14.
Newell, A. et al., "Stacked Hourglass Networks for Human Pose Estimation," ARXIV 2016, published Jul. 26, 2016, pp. 1-17.
Felzenszwalb, P. et al., "A Discriminatively Trained, Multiscale, Deformable Part Model," IEEE Conference on Computer Vision Pattern Recognition, 2008, pp. 1-8.

* cited by examiner

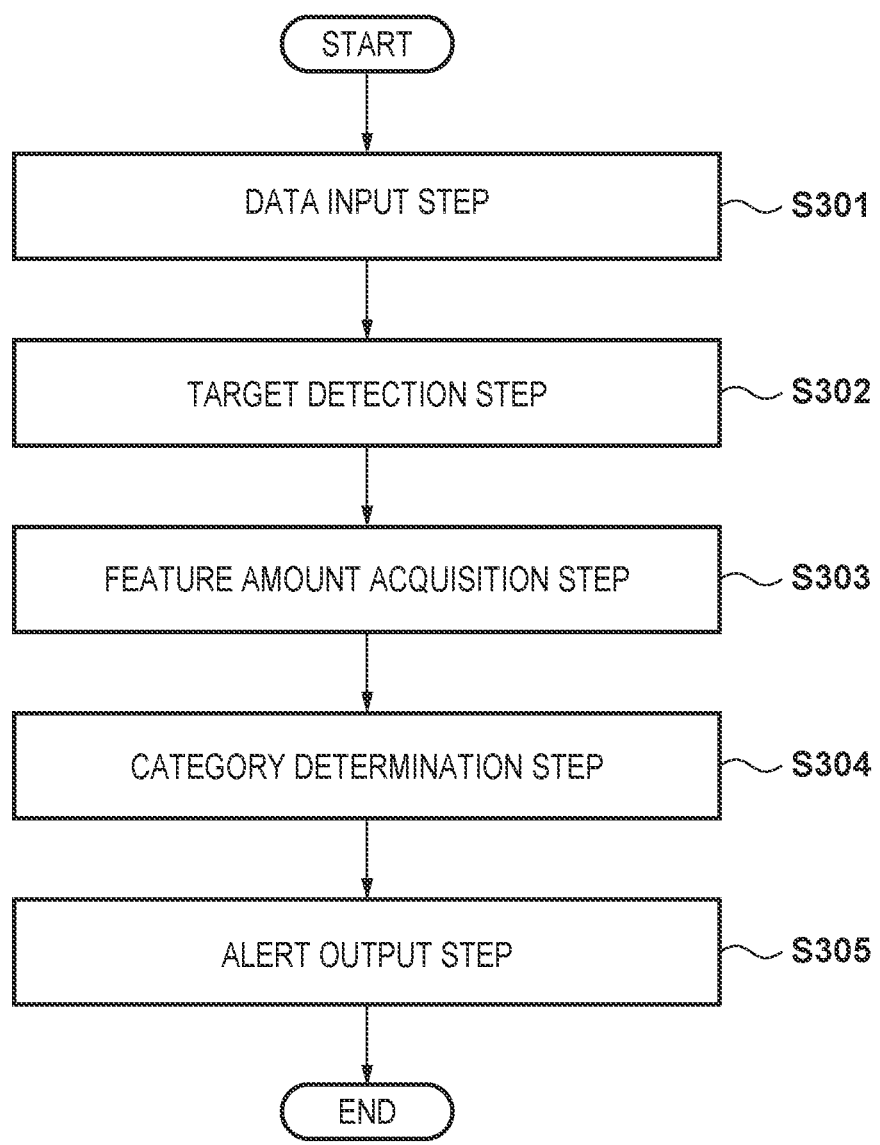

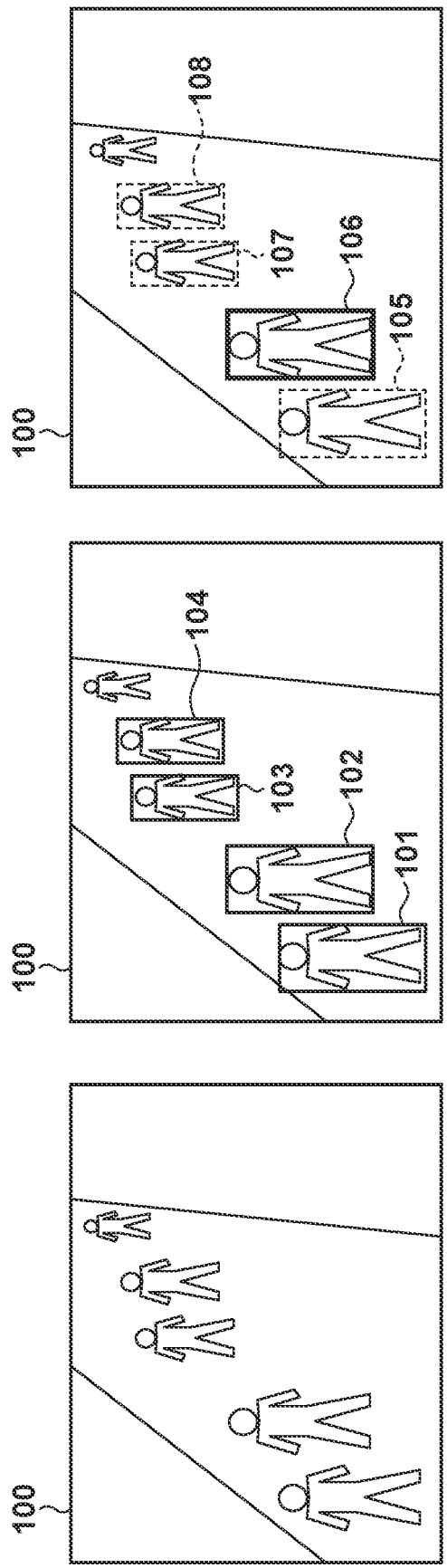

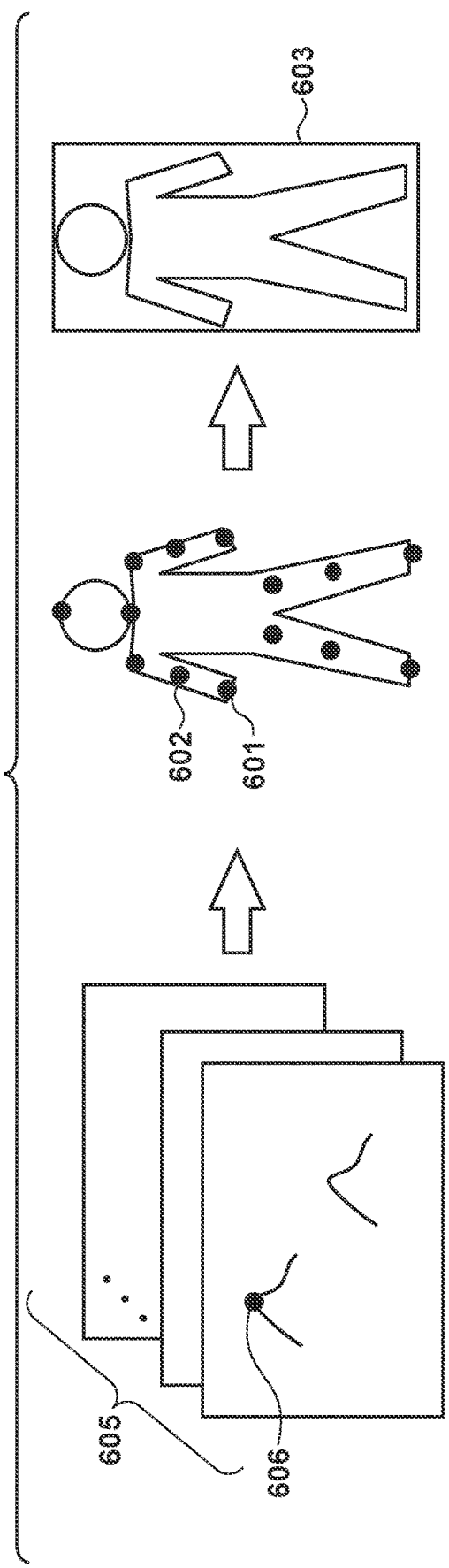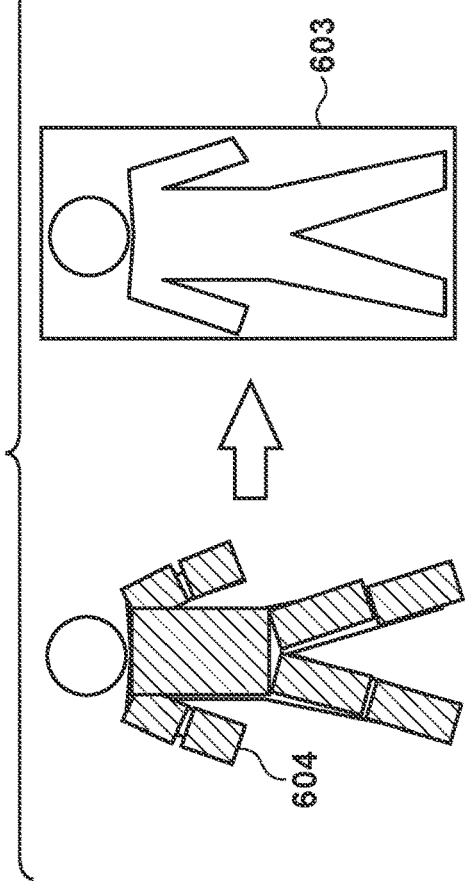

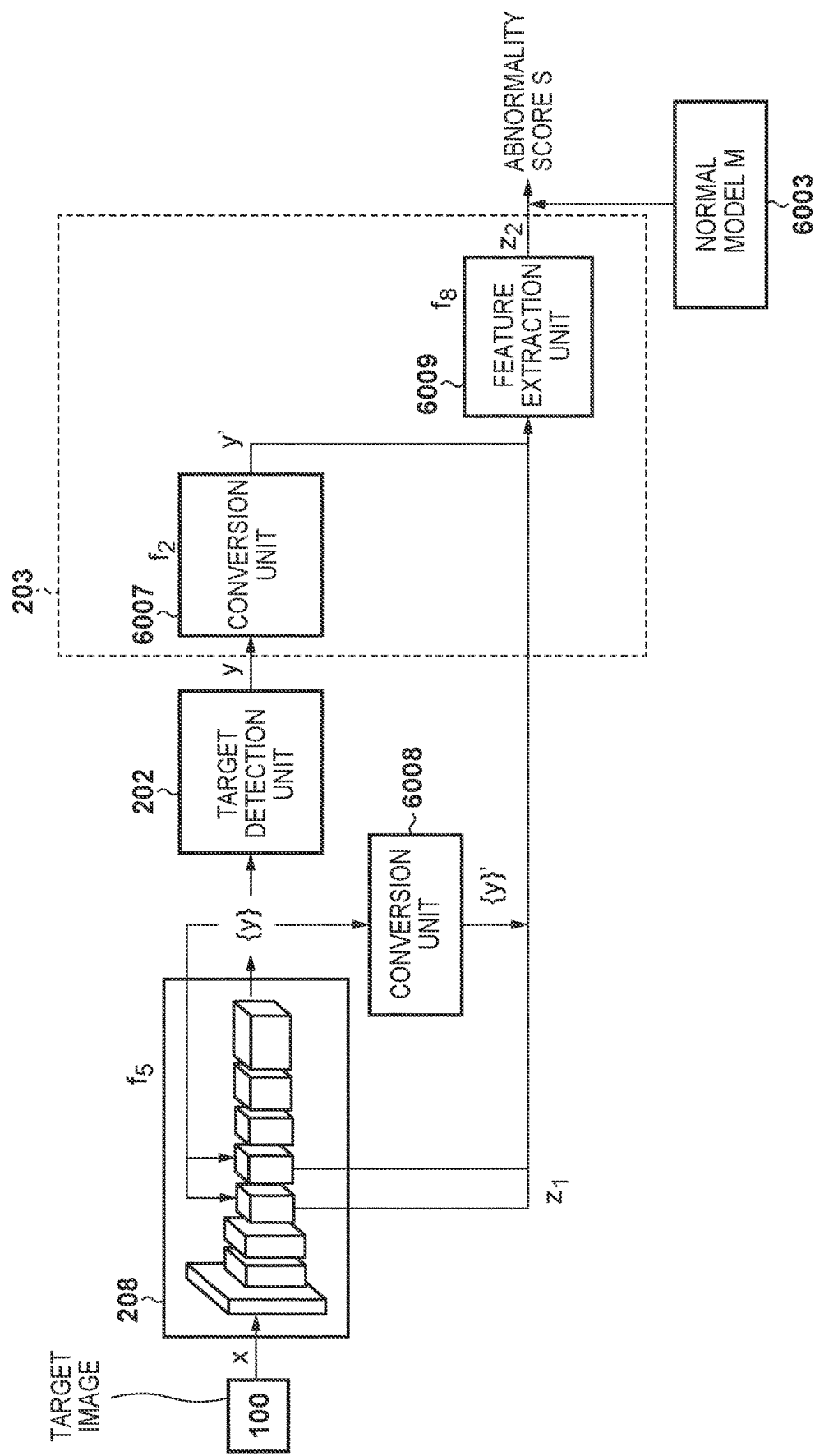

INFORMATION PROCESSING APPARATUS, INFORMATION PROCESSING METHOD, AND MEDIUM

BACKGROUND OF THE INVENTION

Field of the Invention

The present invention relates to an information processing apparatus, an information processing method, and a medium and, for example, to category determination processing for a determination target included in data.

Description of the Related Art

There is provided a service for performing automatic recognition for data obtained using a sensor and reporting in accordance with a recognition result. As a practical example, there is provided a technique of analyzing the activity pattern of a human or a crowd from image or video data acquired by a surveillance camera, detecting a specific event, and reporting it. To implement this service, a technique of recognizing a category (type) such as the category of an object (for example, a human body, a car, a bag, or a basket) or the category of an action (for example, walking or running) has been developed. This service can be used in various environments such as a nursing home, an ordinary household, a public space, and a store.

For example, Japanese Patent Laid-Open No. 2017-091552 discloses a technique of determining whether a human body falls down in an image obtained by a camera. Japanese Patent Laid-Open No. 2017-091552 proposes a technique of detecting a fall based on weighted addition of fall detection result based on the size of a head and fall detection result based on the shape and position of a main body portion such as a body. Japanese Patent Laid-Open No. 2011-227614 discloses a technique of detecting a restrained victim. Japanese Patent Laid-Open No. 2011-227614 proposes a technique of detecting a restrained victim based on the determination result of a variation in posture of a person and the detection result of a physical restraint.

SUMMARY OF THE INVENTION

According to an embodiment of the invention, an information processing apparatus comprises: an acquisition unit configured to acquire data; a detection unit configured to detect a determination target from the data; and a training unit configured to perform training of a determiner for performing category determination concerning the determination target using information of the determination target detected by the detection unit and intermediate data being generated during detection processing by the detection unit and being different from the information of the determination target.

According to another embodiment of the invention, an information processing apparatus comprises: an acquisition unit configured to acquire data; a detection unit configured to detect a determination target from the data; and a determination unit configured to perform category determination concerning the determination target using information of the determination target detected by the detection unit, intermediate data being generated during detection processing by the detection unit and being different from the information of the determination target, and a determiner for performing category determination concerning the determination target.

According to still another embodiment of the invention, an information processing method comprises: acquiring data; detecting a determination target from the data; and training a determiner for performing category determination concerning the determination target using information of the determination target detected and intermediate data being generated during detecting the determination target and being different from the information of the determination target.

According to yet another embodiment of the invention, an information processing method comprises: acquiring data; detecting a determination target from the data; and perform category determination concerning the determination target using information of the determination target detected, intermediate data being generated during detecting the determination target and being different from the information of the determination target, and a determiner for performing category determination concerning the determination target.

According to still yet another embodiment of the invention, a non-transitory computer-readable medium stores a program which, when executed by a computer comprising a processor and a memory, causes the computer to perform: acquiring data; detecting a determination target from the data; and training a determiner for performing category determination concerning the determination target using information of the determination target detected and intermediate data being generated during detecting the determination target and being different from the information of the determination target.

Further features of the present invention will become apparent from the following description of exemplary embodiments (with reference to the attached drawings).

BRIEF DESCRIPTION OF THE DRAWINGS

FIG. 4 is a flowchart illustrating an example of an information processing method of performing category determination;

FIGS. 5A to 5C are views for explaining an example of category determination processing;

FIGS. 12A and 12B are views for explaining a determination target detection method according to still another embodiment;

FIG. 13 is a view showing a processing example of category determination processing according to the embodiment;

DESCRIPTION OF THE EMBODIMENTS

Figure 1:
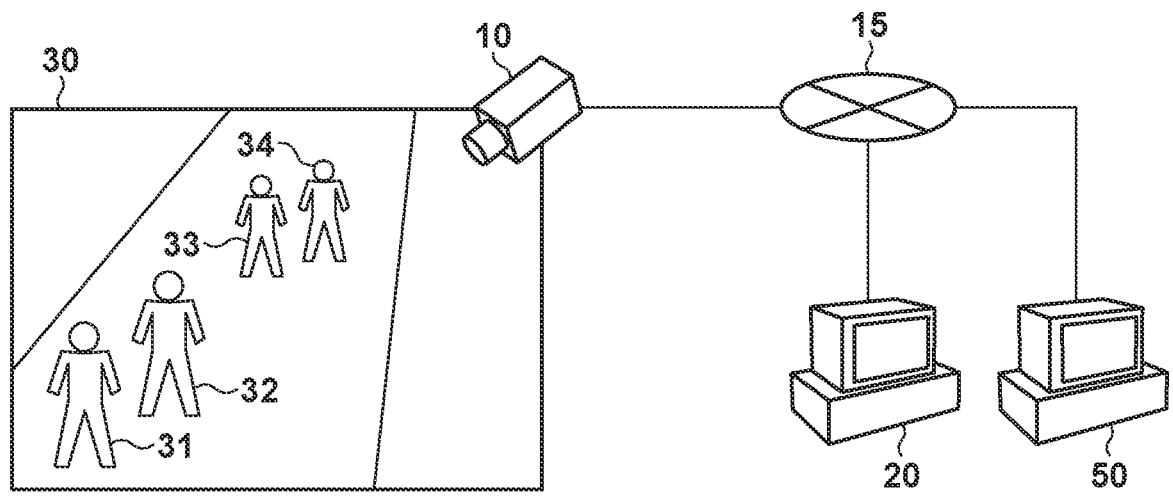
FIG. 1 is a view showing an example of a system configuration according to an embodiment.

To further improve the automatic recognition accuracy, it is important to improve the category determination accuracy, and further improvement is required.

An Embodiment of the present invention can improve the category determination accuracy when detecting a category determination target from input data and performing category determination for the determination target.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An information processing apparatus according to the first embodiment detects a determination target from data, and performs category determination for the detected determination target. The type of data is not particularly limited and, for example, image, video, or sound data may be used. The data may be, for example, data obtained by a sensor such as an image sensor or a sound sensor. In one embodiment, the data is sequence data arranged along a predetermined axis, and may be, for example, image data representing color information along an X-axis and a Y-axis, video data representing color information along an X-axis, a Y-axis, and a time axis, or sound data representing sound information along a time axis.

The determination target is not particularly limited, and may be, for example, an object, a region, a section, or a point. If, for example, a determination target is detected from an image or a video, the determination target may be a predetermined object such as a human body, a face, or an object. If a determination target is detected from a sound, the determination target may be a silent section or a sound change point (or frame). Furthermore, the determination target may be formed by a plurality of elements. For example, the determination target may include a plurality of persons or a plurality of objects. In one embodiment, a section or region extending along one or more predetermined axes is detected as a determination target from data. The determination target may be the type or attribute of the overall data. For example, the determination target may be an event or a scene represented by image data or sound data.

The category to be determined is not particularly limited. For example, the type or attribute of the determination target may be determined as a category concerning the determination target. As a practical example, it can be determined whether the determination target is abnormal. If the determination target is a human body or a face, it may be determined whether the determination target is a male or a female, or a person corresponding to the determination target may be identified by performing a similar person search. Furthermore, if the determination target is a silent section or a sound change point, it may be determined whether the silent section or the sound change point indicates abnormality. In another embodiment, the category to be determined may be a category concerning a plurality of determination targets. As an example, it is possible to perform, based on a plurality of human bodies detected as determination targets from an image, abnormality detection concerning the positions of the plurality of human bodies, in other words, abnormality detection in a scene represented by the image. In one embodiment, as described above, it is possible to determine the category (for example, the type or attribute) of the overall data determined based on the plurality of determination targets. As a practical example, it is possible to determine, as a category concerning a determination target, the attribute (for example, whether a scene is abnormal) or type (for example, the type of an event held in a scene) of the scene represented by image data or sound data.

In general, when performing category determination concerning a determination target, the feature of the determination target is used. For example, it is possible to obtain a category determination result by extracting the feature amount of the determination target and inputting the extracted feature amount to a determiner. In general, as the feature amount of the determination target, the result of processing of detecting the determination target from data, for example, the position and size of the determination target in the image are used. On the other hand, selection of the feature of the determination target to be used for category determination influences the category determination accuracy. To cope with this, in this embodiment, category determination of the determination target is performed using, in addition to detection information as the result of the processing of detecting the determination target, intermediate data (to be referred to as a generated feature at an intermediate layer or an intermediate feature hereinafter) generated during the detection processing and different from the detection information. By using the intermediate feature in this way, it is possible to improve the category determination accuracy. Furthermore, a method of selecting the intermediate feature to be used for category determination will be described below.

The following embodiment will describe an example of detecting a person as a category determination target (to be simply referred to as a determination target hereinafter) from input image data (to be simply referred to as input data hereinafter), and determining, as a category, whether the detected person is abnormal. As described above, in this embodiment, the processing of detecting the determination target from the input data is performed, and detection information is obtained as a result of the processing. The detection information is information of the determination target as the result of the detection processing, and can be, for example, information indicating the position, size, or type of the determination target. The processing of detecting the determination target from the input data is designed to output such detection information as a result. For example, the processing of detecting the determination target can be performed using a determiner obtained by training using the detection information as supervised data. In one embodiment in which the determination target is a section or region (for example, an image region or sound section) extending along one or more predetermined axes, the detection information may be information representing the distribution of the determination target in the data, for example, information representing the position or size of the determination target.

Note that in one embodiment, when performing category determination concerning the determination target, part of input data indicating the determination target (for example, a partial image of the determination target) may be used in addition to the detection information and the intermediate feature. Thus, the intermediate feature is information different from the detection information and different from part of the input data indicating the determination target.

In this embodiment, training of the determiner is performed based on the detection information and the intermediate feature. A detector for detecting the determination target is commonly used in various applications with a high probability while the determiner for performing category determination may be able to improve the determination accuracy by performing adjustment in accordance with an application. If, for example, abnormality determination is performed based on a person detection result, a determination result may change in accordance with the position of a path passable by a person or the like, or in accordance with the position of a camera. In this embodiment, training of the detector may be performed in advance, and training of the determiner may be performed at the site where category determination is performed. Furthermore, in one embodiment, at the time of training of the determiner, it is possible to select an intermediate feature to be used for category determination. In this arrangement, training of the detector can be performed in advance, and then selection of the intermediate feature and training of the determiner can be performed in accordance with an actual application at the site where category determination is performed.

FIG. 1 is a view showing an example of the schematic configuration of a determination system including an information processing apparatus according to this embodiment. In the system shown in FIG. 1, a camera 10 and information processing apparatuses 20 and 50 as examples of components for implementing an information processing apparatus and an information processing method according to this embodiment are connected via a network 15. The information processing apparatus 20 mainly has a role of performing detection and determination for input data, and performs abnormality determination by detecting a person from the input data in this embodiment. The information processing apparatus 50 has a role of performing training of a determiner to be used by the information processing apparatus 20 for determination. Note that the information processing apparatuses 20 and 50 and the camera 10 may integrally be formed. Alternatively, the information processing apparatuses 20 and 50 may integrally be formed. For example, the information processing apparatus 20 may include a determiner training unit 501 or a detector training unit 503 that is provided in the information processing apparatus 50.

The camera 10 is an example of a sensor that acquires input data. In this embodiment, the camera 10 captures an image as input data to undergo detection and determination processing by the information processing apparatus 20. In some cases, the camera 10 may acquire input data for training, which is included in training data used by the information processing apparatus 50. In this case, the information processing apparatus 50 may additionally acquire, from the user, supervisory data included in the training data and corresponding to the input data.

FIG. 1 shows an example of capturing, by the camera 10, a scene (image capturing status) 30 in which persons 31, 32, 33, and 34 as determination targets are walking. The information processing apparatus 20 detects the determination targets (persons) in the scene 30 captured by the camera 10, and performs normality/abnormality determination for each of the detected determination targets. In this embodiment, category determination is performed using target information, an intermediate feature, and a determiner. A case in which a feature amount to be used for abnormality determination (to be referred to as a feature amount for determination hereinafter) is generated from the target information and the intermediate feature and category determination of each determination target is performed using the feature amount for determination and the determiner will be described below. In the following processing, feature data is selected from intermediate data obtained during the detection processing of the detection targets and target information obtained as a result of the detection processing, and conversion processing for the selected feature data is performed. Then, a feature amount for determination is generated using the feature data after conversion.

Figure 2:
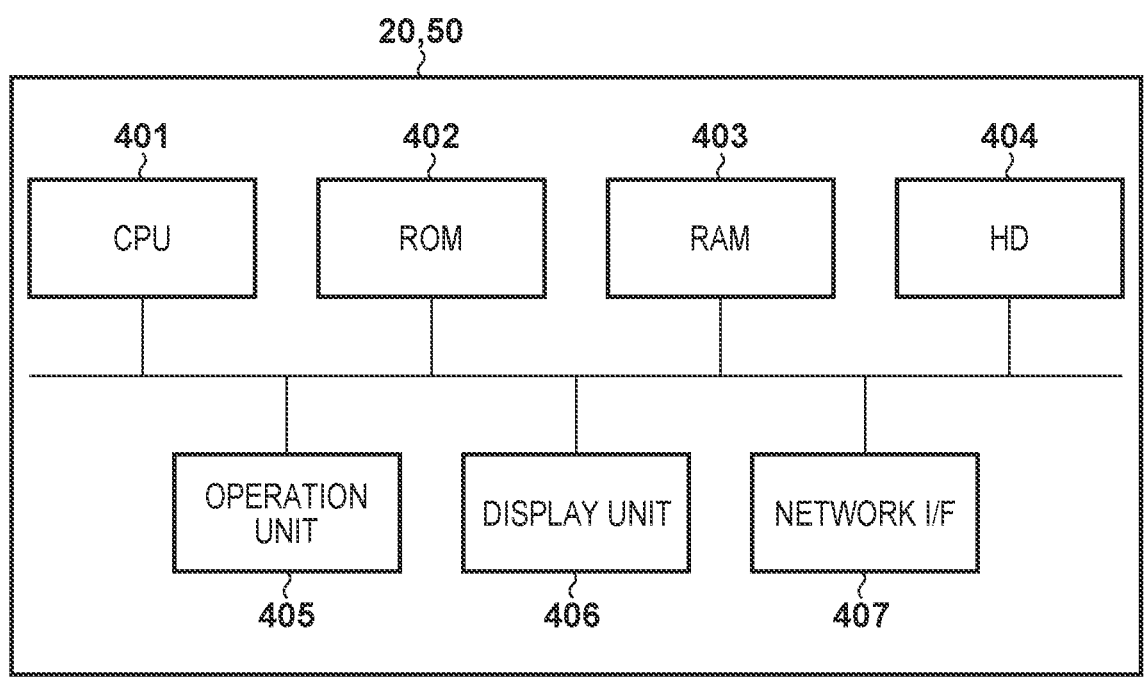
FIG. 2 is a block diagram showing an example of the hardware arrangement of an information processing apparatus according to the embodiment.

FIG. 2 is a block diagram showing an example of the hardware arrangement of each of the information processing apparatuses 20 and 50. Each of the information processing apparatuses 20 and 50 includes a processor like a CPU 401, and memories like a RAM 402, a ROM 403, and an HD 404. The CPU 401 controls the overall information processing apparatus 20 or 50. The RAM 402 is a memory area in which a program to be executed by the CPU 401 is loaded and which functions as the work area of the CPU 401. The ROM 403 is a memory area that stores a program to be executed by the CPU 401 and the like. The HD 404 is a memory area that stores various programs or various data including data concerning a threshold and is used by the CPU 401 to execute processing. When the CPU 401 executes the program stored in the ROM 403 or the HD 404, the functional arrangement of the information processing apparatus 20 or 50 and processing executed by the information processing apparatus 20 or 50 (both will be described later) are implemented.

An operation unit 405 accepts an input operation by the user. A display unit 406 displays information generated by the information processing apparatus 20 or 50. A network I/F 407 connects the information processing apparatus 20 or 50 to an external apparatus.

Figure 3A:
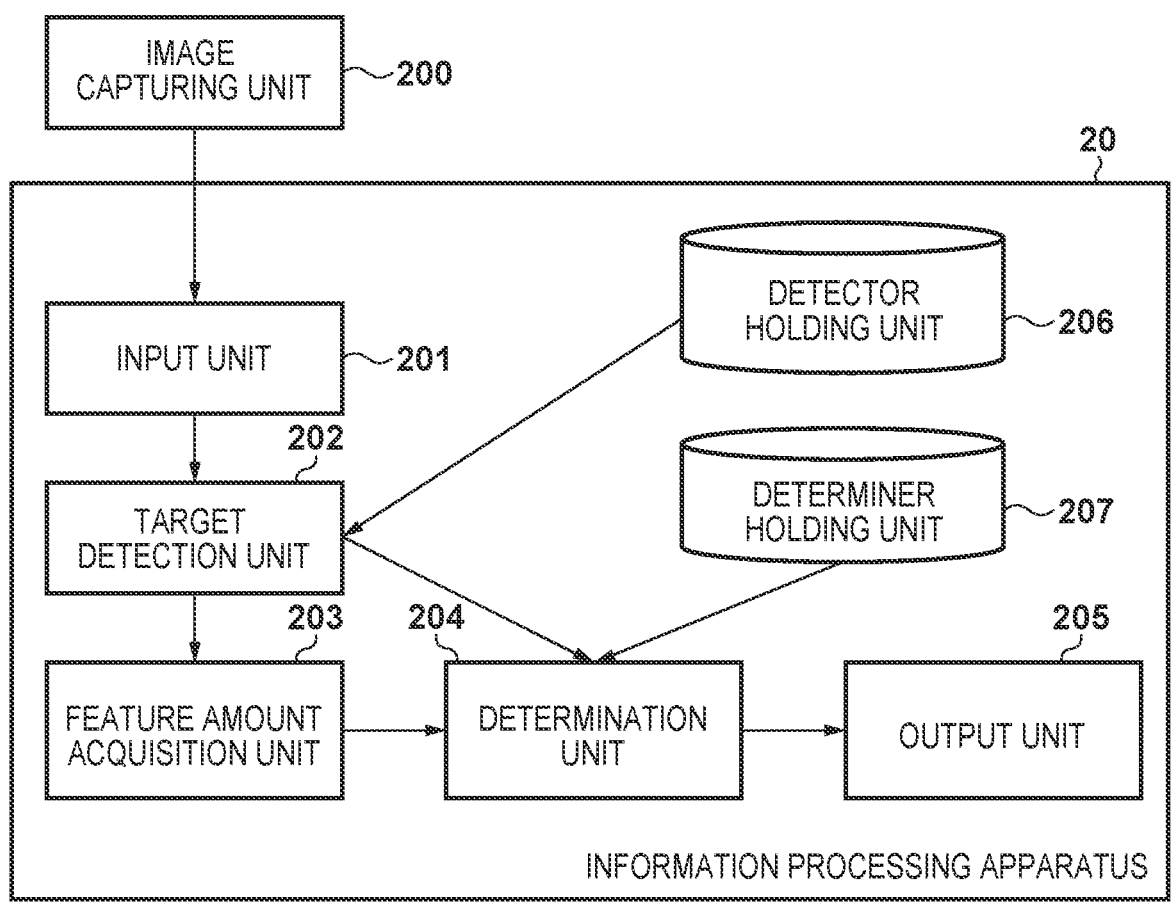
FIGS. 3A to 3D are block diagrams each showing an example of the functional arrangement of an information processing apparatus for performing category determination.

Processing of detecting a determination target in input data and executing determination processing for the determination target will be described first. FIG. 3A shows, as functional blocks, processes executed by the CPU 401 of the information processing apparatus 20 according to this embodiment. Note that FIG. 3A also shows an image capturing unit 200 corresponding to the camera 10 in addition to the functional blocks of the information processing apparatus 20. The image capturing unit 200 acquires input data by capturing the scene 30.

The information processing apparatus 20 according to this embodiment includes an input unit 201, a target detection unit 202, a feature amount acquisition unit 203, a determination unit 204, an output unit 205, a detector holding unit 206, and a determiner holding unit 207. Note that the detector holding unit 206 and the determiner holding unit 207 may be implemented by, for example, the HD 404 or a nonvolatile storage device connected to the information processing apparatus 20. Details of these functions of the information processing apparatus 20 will be described later with reference to FIG. 4 and the like.

FIG. 4 is a flowchart illustrating an overview of an information processing method of performing category determination according to this embodiment. An overview of processes performed by the functional blocks of the information processing apparatus 20 according to this embodiment will be described with reference to FIG. 4. In a data input step (S301), the input unit 201 acquires input data. In this embodiment, the input unit 201 receives input data as an image captured by the image capturing unit 200. The input unit 201 then transmits the acquired input data to the target detection unit 202.

In a target detection step (S302), the target detection unit 202 detects a determination target from the input data transmitted from the input unit 201. In this embodiment, the target detection unit 202 detects a determination target as an abnormality determination target from the image using a detector held in the detector holding unit 206. Then, the target detection unit 202 transmits, to the feature amount acquisition unit 203, detection information as information concerning the detected determination target, and an intermediate feature as intermediate data obtained during detection processing and different from the detection information. If a plurality of detection targets are detected from the input data, the target detection unit 202 can transmit detection information and an intermediate feature concerning each of the plurality of determination targets.

In a feature amount acquisition step (S303), the feature amount acquisition unit 203 generates a feature amount (feature amount for determination) of each determination target based on the detection information and intermediate feature acquired from the target detection unit 202. Abnormality determination is performed for each determination target using the feature amount for determination. The feature amount acquisition unit 203 transmits the acquired feature amount for determination to the determination unit 204.

In step a category determination step (S304), the determination unit 204 performs category determination for each determination target using the feature amount for determination and a determiner for performing category determination concerning the determination target. As a result of the category determination, the determination unit 204 may generate information indicating the category of the determination target, or information indicating whether the determination target is included in a predetermined category. As a result of the category determination, the determination unit 204 may generate a score indicating, for each category, the probability that the determination target belongs to one category or each of a plurality of categories. The determination unit 204 can transmit, as a determination result, the information indicating the category of each determination target to the output unit 205.

In this embodiment, the determination unit 204 performs abnormality determination for each determination target detected by the target detection unit 202 using the determiner for performing abnormality determination held in the determiner holding unit 207 and the feature amount for determination acquired by the feature amount acquisition unit 203. Then, the determination unit 204 transmits, to the output unit 205, the result of the abnormality determination for each determination target, for example, an abnormality score indicating the probability that the determination target is included in an "abnormality" category.

In an alert output step (S305), the output unit 205 outputs information in accordance with the information indicating the category of each determination target obtained in the category determination step (S304). For example, the output unit 205 can output an alert in accordance with the result of the abnormality determination. Note that if the output unit 205 acquires a score indicating, for each category, the probability that the determination target belongs to one category or each of the plurality of categories, it may determine the category of each determination target based on the score, and output information indicating the determined category.

Practical processing examples in steps S301 to S305 will be described in more detail below with reference to FIGS. 5A to 5C which show an example of a processing result. In step S301, the input unit 201 can acquire, as a target image 100 serving as input data, an image obtained when the image capturing unit 200 captures the scene 30 shown in FIG. 1. Note that the input data may be data such as an image stored in an external apparatus (not shown). In this case, the input unit 201 can acquire, as the input data, data such as an image read out from the external apparatus. The image stored in the external apparatus may be, for example, an image captured in advance by the image capturing unit 200 or the like, or an image acquired by another method, for example, via a network. The target image 100 is transmitted to the target detection unit 202.

In step S302, the target detection unit 202 detects a determination target as abnormality determination target from the target image 100 transmitted from the input unit 201 using the detector held in the detector holding unit 206. The detector is trained in advance using the information processing apparatus 50 or another apparatus. The detector and a training method therefor can be selected in accordance with the type of the determination target. For example, if the determination target is a human body, a human body detector can be used. Examples of the human body detector are disclosed in, for example, non-patent literatures 1 and 2. Note that a practical example of a training method for the detector will be described later.

Non-patent literature 1 ("You Only Look Once: Unified, Real-Time Object Detection", International Conference on Computer Vision and Pattern Recognition 2016) discloses a method of detecting a determination target using a DNN. In the method of non-patent literature 1, the position and size of a bounding box surrounding a determination target are obtained by inputting input data to the DNN. Particularly in the method of non-patent literature 1, processing of extracting a feature amount to be used to detect a determination target and processing of discriminating a determination target are performed at once.

Non-patent literature 2 ("Histograms of Oriented Gradients for Human Detection", Navneet Dalal and Bill Triggs, International Conference on Computer Vision and Pattern Recognition 2005) discloses a method of detecting a determination target using an SVM (Support Vector Machine). In the method of non-patent literature 2, a HOG (Histogram Of Gradients) feature amount is acquired as an image feature amount for a local region, and input to an SVM as a discriminator, thereby discriminating whether the local region is a region of a determination target. By repeating this processing, a determination target is detected.

In this embodiment, the target detection unit 202 can obtain, as the detection result of a determination target, a detection result whose detection score (probability that a detection target is correctly detected) obtained using the human body detector is equal to or larger than a predetermined threshold. FIG. 5B shows an example of a result obtained by human detection for the input data shown in FIG. 5A. FIG. 5B shows, as a human detection result, determination targets 101, 102, 103, and 104 by rectangles. In this embodiment, the target detection unit 202 transmits, as target information, information indicating the position and size of each determination target to the feature amount acquisition unit 203. The target detection unit 202 may also transmit, as target information, the detection score of each determination target to the feature amount acquisition unit 203, or transmit, as target information, the category estimation result of each determination result to the feature amount acquisition unit 203. A category determination result by the information processing apparatus 20 is generated by the determination unit 204. Note that similar to the intermediate feature, the target detection unit 202 may select part of the information of the determination target obtained as a result of the detection processing and transmit it as target information to the feature amount acquisition unit 203.

The target detection unit 202 further transmits, to the feature amount acquisition unit 203, the intermediate feature generated during the detection processing. The target detection unit 202 can select, as the intermediate feature, part of the data generated during the detection processing. For example, if a determination target is detected using a neural network, the intermediate feature may include an output from an intermediate layer of the neural network. For example, the intermediate feature may include output results from one or more preselected layers among the output results of the layers of the neural network. The intermediate feature may be an output result in a preselected portion among the output results of one or more preselected layers, for example, an output result in a preselected output channel (dimension) or an output result in a preselected region. If the intermediate feature includes output results from two or more layers, the target detection unit 202 may send, as the intermediate feature, to the target detection unit 202, data obtained by combining the output results from the layers. The target detection unit 202 may send, as the intermediate feature, to the target detection unit 202, data obtained by processing using the output results from the layers. If a determination target is detected by inputting a feature amount such as a HOG feature amount to a discriminator such as an SVM, the intermediate feature may be a feature amount input to the discriminator or a feature amount preselected from a plurality of feature amounts input to the discriminator. The intermediate feature may be data of a preselected dimension of feature amounts.

Figure 6:
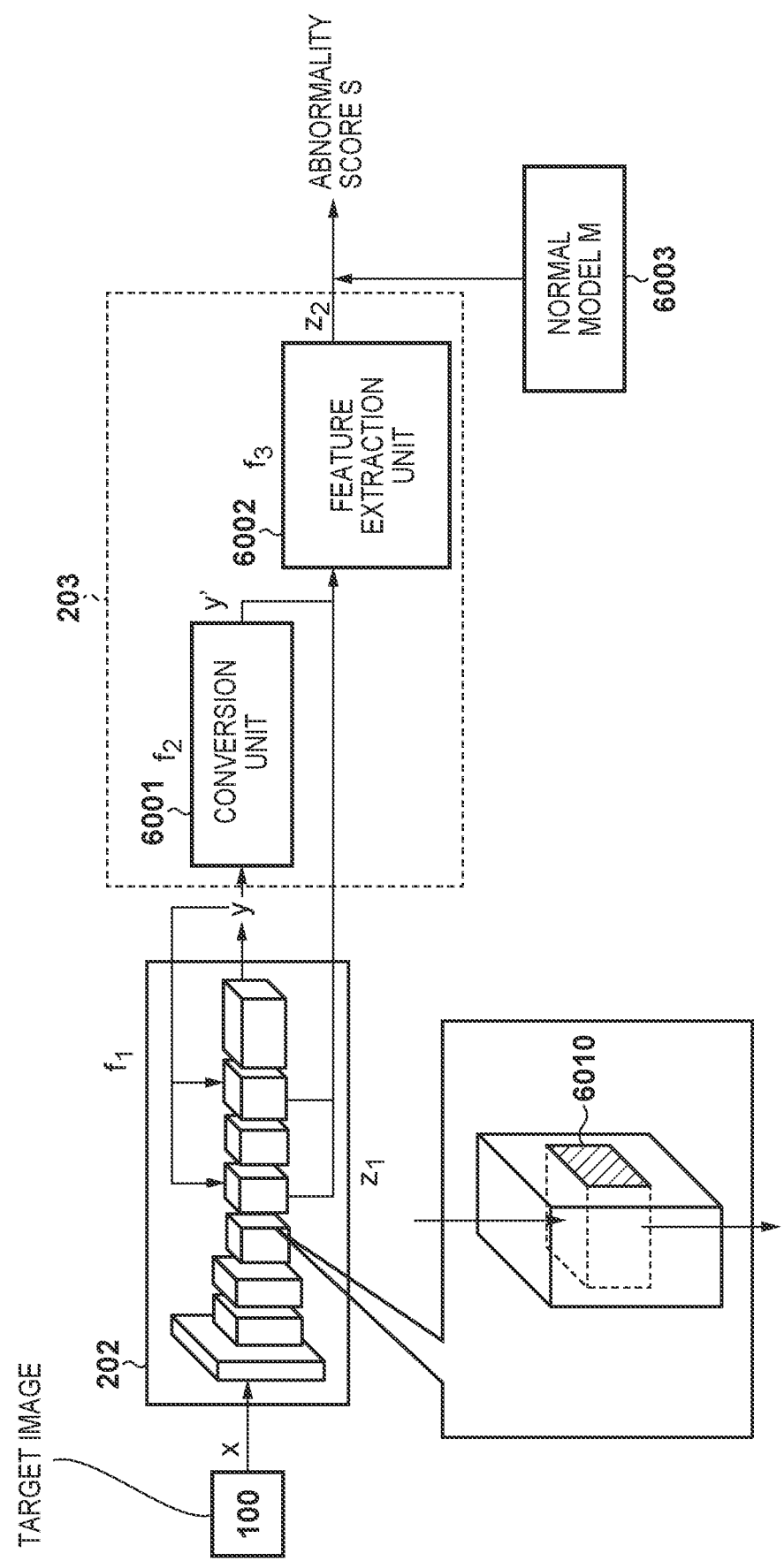
FIG. 6 is a view showing a processing example of the category determination processing according to the embodiment.

A practical processing example for generating target information and an intermediate feature in the example using the DNN will be described below. FIG. 6 shows an example of the input/output relationship between processing units in processing from when the target image 100 is input to the information processing apparatus 20 until the information processing apparatus 20 outputs an abnormality score S.

The target detection unit 202 inputs the target image 100 to the DNN, and acquires an output result as a detection result y of a determination target from the DNN. The target detection unit 202 transmits the detection result y as target information to the feature amount acquisition unit 203. When x represents the target image 100 and $f_1$ represents processing performed by the target detection unit 202 using the DNN, the detection result y is given by:

$$y = f_1(x) \quad (1)$$

The target detection unit 202 also transmits, to the feature amount acquisition unit 203, an intermediate feature $z_1$ generated during the detection processing. In the example shown in FIG. 6, the intermediate feature $z_1$ is part of outputs from two preselected layers among the layers forming the DNN that outputs the detection result y. That is, in the example shown in FIG. 6, a combination of portions 6010 of the outputs from the two selected layers is used as the intermediate feature $z_1$.

Figure 7:
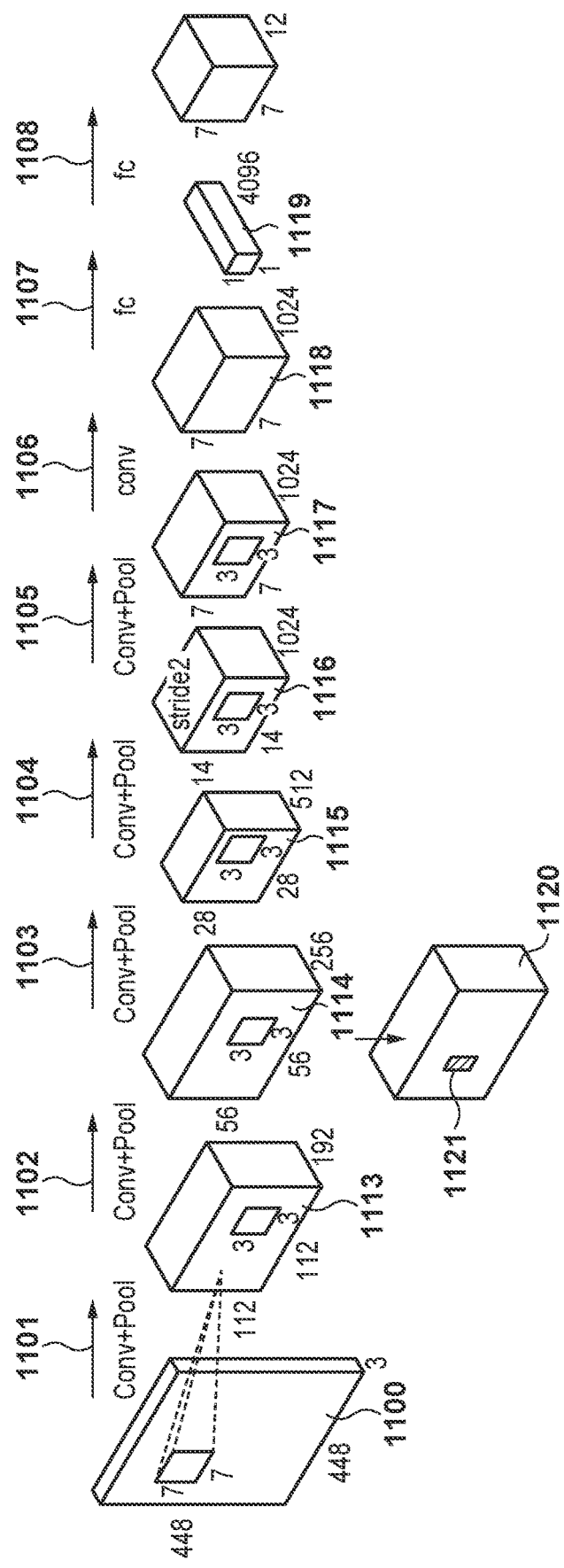
FIG. 7 is a view showing an example of a neural network for detecting a determination target.

FIG. 7 shows an example of the DNN usable by the target detection unit 202. In the example shown in FIG. 7, the target image 100 having a size of 448×448 and three channels is input to the DNN, thereby obtaining an output result of 7×7×12. The processing using the DNN shown in FIG. 7 includes processes 1101 to 1108. In Conv+Pool processes as the processes 1101 to 1105, convolution and nonlinear processes called ReLU and max pooling are sequentially performed. ReLU is one of nonlinear processes, and is processing of setting a negative value of the result of the convolution processing to 0, given by:

$$x = \max(0, x) \quad (2)$$

Instead of ReLU, another nonlinear processing such as processing using a sigmoid function may be used.

Furthermore, max pooling is processing of outputting a maximum value within a predetermined range. ReLU and max pooling are representative nonlinear processes used in the neural network, and are also used in non-patent literature 1 and non-patent literatures 3 and 4 (to be described later).

The processing 1106 is processing of performing convolution and ReLU. The processes 1107 and 1108 indicate that all the nodes of layers 1118 and 1119 are connected to all the nodes of the next layer, that is, the layers 1118 and 1119 are fully-connected layers.

In the output result, 7×7 represents the number of blocks. That is, the output result obtained in FIG. 7 indicates a target detection result for each of 7×7 divided images of the target image 100. The processing shown in FIG. 7 corresponds to processing of dividing the target image 100 into 7×7 blocks, and detecting a target for each block. 12 is the dimension of the detection result. A breakdown of the detection result in the example shown in FIG. 7 is 2 (number of bounding boxes)×(4 (position and size of detected bounding box)+1 (detection score))+2 (class likelihood). The bounding box is a circumscribed rectangle surrounding the detected determination target. The position and size of the bounding box can be represented by, for example, four-dimensional information including the coordinates (X, Y) of the upper left vertex, a width (W), and a height (H). A detection score (Pr) is information indicating the accuracy of the obtained position and size of the bounding box, and can be overlapping ratio between the bounding box and GT (supervised value). In the example shown in FIG. 7, two bounding boxes are detected from one block. That is, for each bounding box, information indicating the position and size and the detection score are output. The class likelihood represents a probability at which the target belonging to each class exists in the block. For example, one dimension may represent a probability at which the block is normal and another dimension may represent a probability at which the block is abnormal.

In the example shown in FIG. 7, information (position and size) concerning a bounding box whose detection score is equal to or larger than a predetermined threshold can be used as the detection result y. The intermediate feature may be the output result of a preselected layer among intermediate layers 1113 to 1119 shown in FIG. 7, or an output result in a preselected output channel. The target detection unit 202 may extract part of the output result of the intermediate layer in accordance with the position or size of the bounding box, i.e., the detection result. For example, the target detection unit 202 may send, as the intermediate feature, to the feature amount acquisition unit 203, a region 1121, corresponding to a bounding box whose detection score is equal to or larger than the predetermined threshold, of an output result 1120 of the intermediate layer 1114. In another example, the feature amount acquisition unit 203 may receive the detection result y and the output result 1120, and extract the region 1121 based on the detection result y.

Note that if a plurality of determination targets are detected, the target detection unit 202 can transmit target information of each determination target to the feature amount acquisition unit 203. For example, the target detection unit 202 can use, as the detection result y, information concerning two or more bounding boxes each having a detection score equal to or larger than the predetermined threshold. The target detection unit 202 may transmit, to the feature amount acquisition unit 203, an intermediate feature common to the determination targets, or transmit different intermediate features for the determination targets to the feature amount acquisition unit 203. For example, the target detection unit 202 may transmit, to the feature amount acquisition unit 203, the detection result y of each bounding box and an intermediate feature (a region, corresponding to the bounding box, of the output result of the intermediate layer) corresponding to each detection result y. A case in which only one determination target is detected will mainly be explained below.

In step S303, the feature amount acquisition unit 203 generates a feature amount for determination based on the target information and the intermediate feature transmitted in step S302. The feature amount acquisition unit 203 may perform conversion processing for at least one of the target information and the intermediate feature to generate a feature amount for determination based on the feature amount after conversion. Note that the format of the detection result y used in the processing in step S303 is not particularly limited. For example, the detection result y used in processing $f_2$ may be, for example, a vector having, as elements, the coordinates and size of the bounding box as the detection result of the determination target. Furthermore, the detection result y is a two-dimensional vector which is a two-dimensional map of the same size as that of the target image 100 and in which an element value at a position where the determination target exists is 1 and the remaining element values are 0. The target detection unit 202 may transmit the detection result y in this format to the feature amount acquisition unit 203, and the feature amount acquisition unit 203 may convert the detection result y into this format.

The feature amount acquisition unit 203 acquires a feature amount $z_2$ for determination corresponding to the detection result y based on the detection result y and the intermediate feature $z_1$. In one embodiment, the feature amount $z_2$ for determination is a linear combination of the detection result y or a feature amount y' as the conversion result of the detection result y and the intermediate feature $z_1$ or its conversion result. For example, the feature extraction unit 6002 provided in the feature amount acquisition unit 203 can obtain the feature amount $z_2$ for determination using processing $f_3$, given by:

$$z_2 = f_3(y' + z_1) \tag{3}$$

As another example, the feature amount $z_2$ for determination may be a result of combining the detection result y or the feature amount y' as the conversion result of the detection result y and the intermediate feature $z_1$ or its conversion result.

The conversion unit 6001 provided in the feature amount acquisition unit 203 can obtain the feature amount y' from the detection result y using the processing $f_2$, given by:

$$y' = f_2(y) \tag{4}$$

In this embodiment, the dimension of the feature amount y' matches that of the intermediate feature $z_1$, and the processing $f_2$ is designed to obtain the feature amount y'.

The dimension of the detection result y may not match that of the intermediate feature $z_1$. For example, the dimension of the detection result y may be lower than that of the intermediate feature $z_1$. In this case, if determination or training of the determiner is performed using the detection result y and the intermediate feature $z_1$, the detection result y may hardly be reflected on the determination result. The detection result y may not be in a form in which distance calculation is possible, and error evaluation at the time of training may not be easy. To cope with this, in this embodiment, the feature amount acquisition unit 203 converts the detection result y into the feature amount y' using the processing $f_2$ for conversion.

Figure 8:
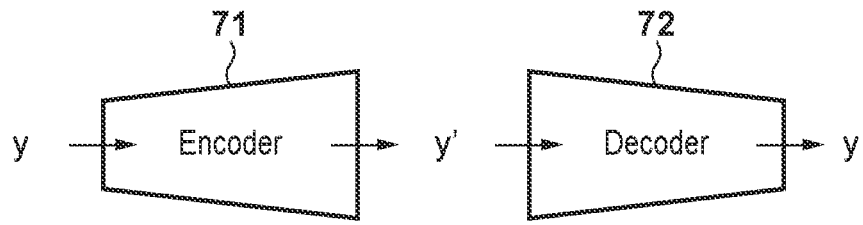
FIG. 8 is a view for explaining an example of conversion processing of a detection result according to the embodiment.

The processing $f_2$ for conversion is not particularly limited. The processing $f_2$ may be decided by training. As an example, the processing $f_2$ may be processing of mapping the detection result y to a high-dimensional space using a neural network. For example, as shown in FIG. 8, a model in which the detection result y is reconstructed by inputting the detection result y to an encoder 71 and inputting an output from the encoder 71 to a decoder 72 can be used. In this case, the feature amount acquisition unit 203 can acquire the conversion result of the detection result y by the encoder 71 as the feature amount y'. For example, it is possible to acquire, as a latent variable, the feature amount y' as the conversion result by using a variational auto-encoder described in non-patent literature 5 ("Auto-Encoding Variational Bayes", Diederik P. Kingma, Max Welling, arxiv 2013). The processing by the encoder 71 obtained by the above processing can be set as the conversion processing $f_2$.

Alternatively, the processing $f_2$ may be designed by the user. For example, the detection result y may include the coordinates (X, Y), size (W, H), and detection score (Pr) of the bounding box. The feature amount acquisition unit 203 (or target detection unit 202) may perform conversion processing for the detection result y, as needed. For example, the feature amount acquisition unit 203 can divide the values of X and Y by the size of the target image 100 so that a range is of −1 to 1, as given by equations (5) and (6) below. In equations (5) and (6), X' and Y' represent feature amounts concerning the coordinates of the bounding box after conversion.

$$X' = (X - X_0)/(\text{size (width) of target image 100}) \tag{5}$$

$$Y' = (Y - Y_0)/(\text{size (height) of target image 100}) \tag{6}$$

where $X_0$ and $Y_0$ represent reference coordinates arbitrarily defined in the target image 100.

The feature amount acquisition unit 203 may acquire an average bounding box size in advance, and divide the size of the bounding box by this value. For example, conversion can be performed in accordance with equations (7) and (8) where ($W_0$, $H_0$) represents the average bounding box size, and (W', H') represents a feature amount concerning the bounding box size after conversion.

$$W'=W/W_0 \quad (7)$$

$$H'=H/H_0 \quad (8)$$

In this case, the processing $f_2$ can be given by:

$$y'=\{(X',Y',W',H'),Pr\} \quad (9)$$

The feature amount acquisition unit 203 can also perform conversion processing for the intermediate feature $z_1$. In this embodiment, the feature amount acquisition unit 203 uses, as the intermediate feature $z_1$ input to equation (3), the output result of the intermediate layer corresponding to the detection result y like the region 1121 shown in FIG. 7.

The feature amount acquisition unit 203 transmits the thus acquired feature amount $z_2$ for determination to the determination unit 204.

In step S304, the determination unit 204 performs abnormality determination for each determination target using the feature amount for determination acquired in step S303. The determiner holding unit 207 holds the pre-trained determiner, and the determination unit 204 can perform abnormality determination using the determiner. FIG. 6 shows an example of using a normal model for abnormality determination. For example, the determination unit 204 can acquire the abnormality score S indicating the degree of abnormality of the determination target using the feature amount $z_2$ for determination obtained in step S303 and a normal model M (6003 in FIG. 6). With, for example, processing $f_4$ using the determiner, the determination unit 204 can obtain the abnormality score S by:

$$S=f_4(z_2,M) \quad (10)$$

On the other hand, in another example, the determination unit 204 may use, as a determiner, a discriminator for discriminating between normality and abnormality. For example, the determination unit 204 may perform abnormality determination for each determination target by inputting the feature amount $z_2$ for determination to the determiner. In another embodiment in which the determination unit 204 performs another class discrimination, the determination unit 204 may use, as a determiner, a regressor that gives, as a regression value, information indicating the discriminated category. Such discriminator and regressor can be implemented using, for example, an SVM.

The determination unit 204 can transmit the thus obtained abnormality score concerning each determination target to the output unit 205.

In step S305, the output unit 205 outputs an alert in accordance with the abnormality score obtained in step S304. For example, if abnormality of the determination target included in the target image 100 is detected, the output unit 205 can output an alert. As an example, if the abnormality score of the determination target is equal to or larger than a preset threshold, the output unit 205 can output an alert with respect to the determination target. If a plurality of detection targets are detected from the target image 100, the output unit 205 can output an alert based on an abnormality score obtained for each determination target.

As an example, the output unit 205 may select, from the plurality of determination targets, a determination target whose abnormality score exceeds the threshold, and output an alert together with information indicating the selected determination target. FIG. 5C shows an example in which, as a result of the processing by the determination unit 204 and the output unit 205 for each of the determination targets 101 to 104 detected in step S302, only the abnormality score of a determination target 106 exceeds the threshold, and only the determination target 106 is determined as abnormal. In FIG. 5C, the determination target 106 determined as abnormal is distinguished from determination targets 105, 107, and 108 with low degrees of abnormality, and highlighted. In the example shown in FIG. 5C, the regions of the determination targets 105, 107, and 108 are represented by dotted lines. However, these regions need not be indicated.

As another example, based on the statistic value of the abnormality scores of the determination targets, for example, the maximum value, average value, or median, the output unit 205 can decide whether to output an alert. When a plurality of target images 100 are sequentially input as a sequence to the information processing apparatus 20, if a period during which the abnormality score exceeds the threshold is longer than a predetermined period, the output unit 205 may output an alert.

Figure 9A:
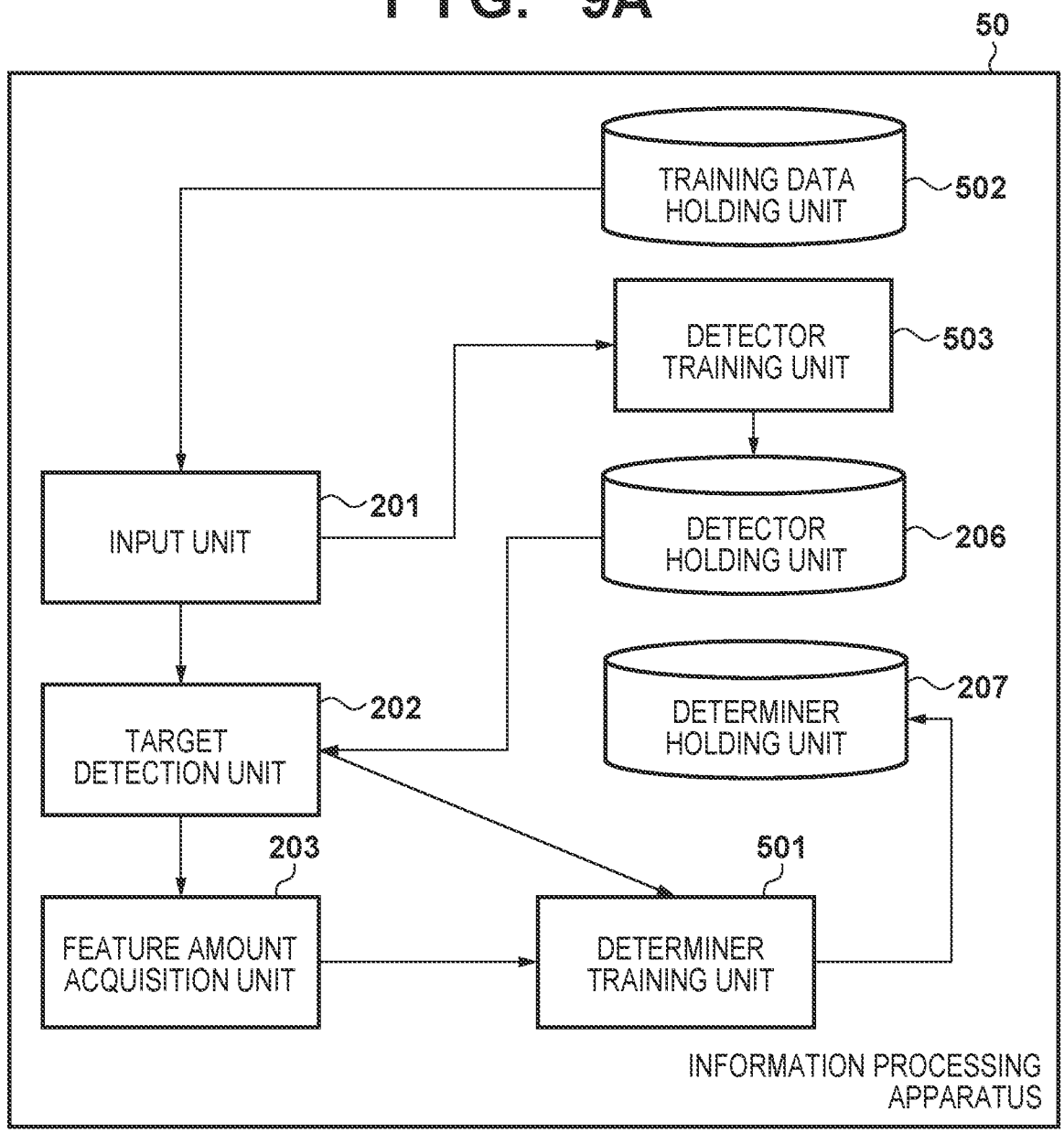
FIGS. 9A to 9D are block diagrams each showing an example of the functional arrangement of an information processing apparatus for performing training of a determiner.

Examples of the arrangement and processing of the information processing apparatus 50 that performs training of the detector and determiner to be used by the information processing apparatus 20 will be described next. FIG. 9A shows, as functional blocks, processes executed by the CPU 401 of the information processing apparatus 50 according to this embodiment. A training data holding unit 502 may be, for example, the HD 404 or a nonvolatile storage device connected to the information processing apparatus 50. The arrangements and processes of the target detection unit 202, the feature amount acquisition unit 203, the detector holding unit 206, and the determiner holding unit 207 are the same as those in the information processing apparatus 20 and only the difference will be described below.

Figure 10A:
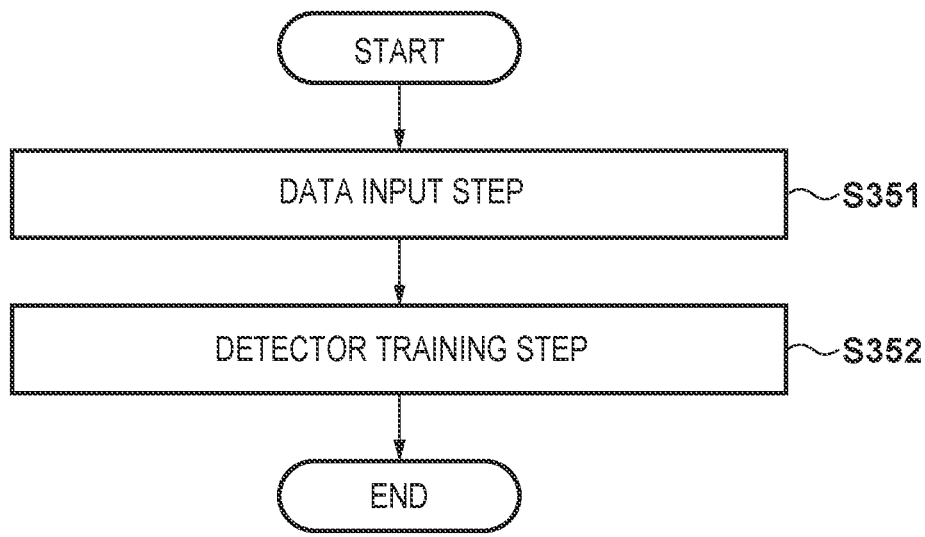
FIGS. 10A to 10C are flowcharts each illustrating an example of an information processing method of performing training of a determiner.

FIG. 10A is a flowchart illustrating an overview of processes executed by the functional blocks when the information processing apparatus 50 performs training of the detector. In this embodiment, training of the detector is performed in accordance with the flowchart shown in FIG. 10A, and training of the determiner is successively performed in accordance with a flowchart shown in FIG. 10B. Note that the detector may be trained in advance. In this case, training of the determiner can be performed using the detector prepared in advance.

In step S351 as a data input step, the input unit 201 acquires training data held in the training data holding unit 502, and sends it to the detector training unit 503. The training data sent to the detector training unit 503 by the input unit 201 includes input data for training. If supervised training of the detector is performed, the training data can include supervisory data for the detector as information of the determination target indicated in the input data for training. The supervisory data is information concerning the same item as that of the information of the determination target, which is obtained by the detection processing by the target detection unit 202 of the information processing apparatus 20. For example, if the target detection unit 202 of the information processing apparatus 20 acquires the coordinates and size of the determination target (or bounding box) using the detector, the supervisory data is information indicating the coordinates and size of the determination target indicated in the input data for training.

In step S352 as a detector training step, the detector training unit 503 performs training of the detector using the training data obtained in step S351. A practical detector training method is not particularly limited, and a known method according to the type of the detector may be used. For example, if a DNN is used as a detector, it is possible to perform training of the detector using error backpropagation based on an error between the supervisory data and an output obtained by inputting input data for training to the DNN. Alternatively, if an SVM is used as a detector, it is possible to perform training of the detector using a margin maximization method. Then, the detector training unit 503 transmits the detector after training to the detector holding unit 206, and the detector holding unit 206 holds the transmitted detector.

Figure 10B:
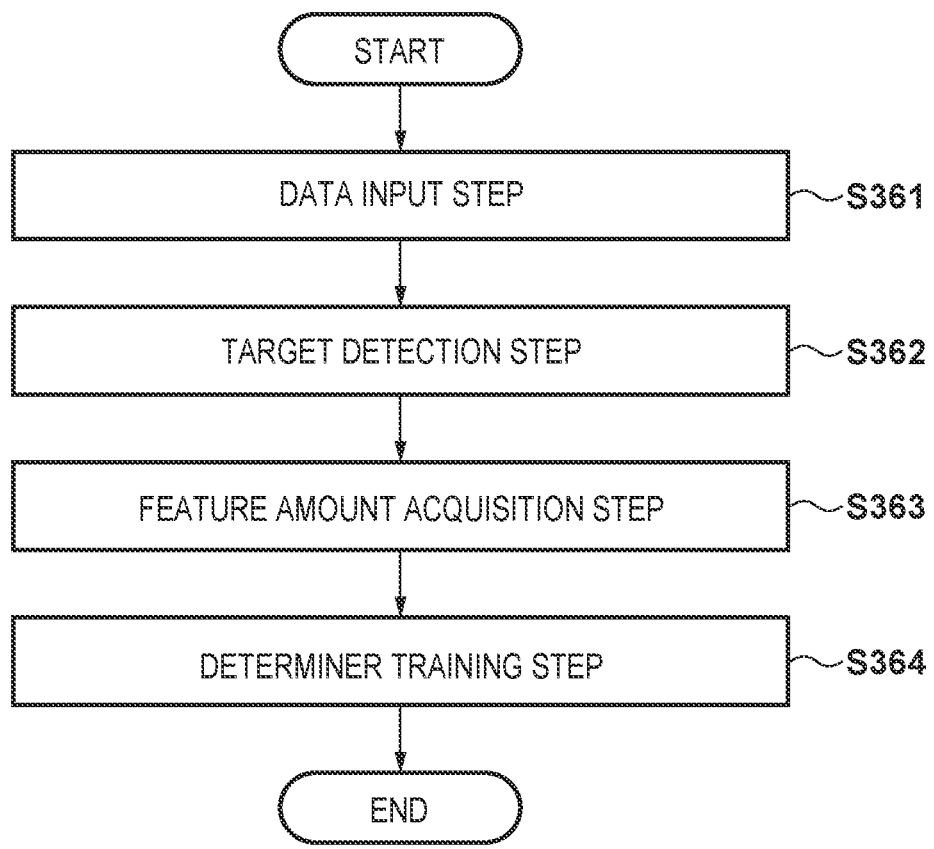

FIG. 10B is a flowchart illustrating an overview of processes executed by the functional blocks when the information processing apparatus 50 performs training of the determiner. In this embodiment, similar to the information processing apparatus 20, a determination target is detected from input data. Then, training of the determiner for performing category determination for the determination target is performed using an intermediate feature and detection information as the detection result of the determination target. In the following example, a case in which a feature amount (to be referred to as a feature amount for training hereinafter) to be used for training of the determiner is generated from the target information and the intermediate feature, and then training of the determiner is performed using the feature amount for training, similar to the information processing apparatus 20, will be described. Especially in the following processing, similar to the information processing apparatus 20, feature data is selected from intermediate data obtained during the detection processing of the detection target and the target information obtained as a result of the detection processing, and conversion processing is performed for the selected feature data. Then, a feature amount for training is generated using the feature data after conversion.

In step S361 as a data input step, the input unit 201 acquires training data held in the training data holding unit 502, and sends it to the target detection unit 202. The training data sent to the target detection unit 202 by the input unit 201 includes input data for training. When performing supervised training of the determiner, the training data can include supervisory data for the determiner, which represents a determination result concerning the determination target indicated in the input data for training. On the other hand, only input data for training which represents a normal determination target may be used as training data. If the input data for training indicates a plurality of determination targets, and the determination results of the determination targets are different, the training data may include information for specifying each determination target such as supervisory data for the detector and information indicating the category of each determination target.

In step S362 as a target detection step, the target detection unit 202 detects a determination target from the input data for training using the detector trained in accordance with FIG. 10A. Then, the target detection unit 202 sends detection information obtained by the detection processing and the intermediate feature to the feature amount acquisition unit 203. Detailed processing may be similar to that of the information processing apparatus 20.

In step S363 as a feature amount acquisition step, the feature amount acquisition unit 203 generates, using the detection information and the intermediate feature acquired from the target detection unit 202, a feature amount for training to be used for training of the determiner. The feature amount acquisition unit 203 sends the obtained feature amount for training to the determiner training unit 501. Detailed processing may be similar to the processing of generating a feature amount for determination by the information processing apparatus 20.

In step S364 as a determiner training step, the determiner training unit 501 performs training of the determiner using the feature amount for training acquired from the feature amount acquisition unit 203. The determiner training unit 501 sends the determiner obtained by training to the determiner holding unit 207, and the determiner holding unit 207 holds the determiner.

A training method is not particularly limited. It is possible to adopt known supervised training or unsupervised training in accordance with the type of the determiner. For example, the determiner training unit 501 can perform training of the determiner that provides a determination result for a feature amount with reference to supervisory data corresponding to the feature amount. If the determiner is a discriminator for classification into two classes of normality and abnormality, the determiner training unit 501 can perform training of the determiner based on $\partial E/\partial f_3$ calculated using a class classification error E.

As another method, the determiner training unit 501 can obtain the normal model M by training using normal data as input data for training. In this case, the determiner training unit 501 estimates parameters for defining the normal model using the feature amount $z_2$ for training. Similar to the feature amount for determination, the feature amount $z_2$ for training can be obtained based on the intermediate feature $z_1$ and the feature amount y' obtained by converting the detection result y. For example, the determiner training unit 501 can acquire, as the parameters for defining the normal model, the mixing ratio of the distributions of Gaussian mixture models representing the feature amounts of the normal data, an average vector, and a covariance matrix.

A conversion unit 6001 and a feature extraction unit 6002 provided in the feature amount acquisition unit 203 may also be formed by a neural network. In this case, the determiner training unit 501 can further calculate $\partial E/\partial f_2$, and perform training of the conversion unit 6001 and the feature extraction unit 6002 using error backpropagation.

By the above method, the information processing apparatus 50 can perform training of the determiner.

In the above example, similar to a case in which the information processing apparatus 20 generates a feature amount for determination, the feature amount acquisition unit 203 generates a feature amount for training based on the detection information and the intermediate feature. That is, in the example shown in FIG. 7, the output from the intermediate layer 1114 preselected from the intermediate layers 1113 to 1119 is used as an intermediate feature for generating a feature amount for determination. A method of acquiring an intermediate feature to be used to generate a feature amount for determination is preset. In this case, the feature amount acquisition unit 203 can use the output from the preselected intermediate layer 1114 as an intermediate feature for generating a feature amount for training.

On the other hand, an intermediate feature to be used for training of the determiner by the determiner training unit 501 may be settable from a plurality of feature amounts. That is, the feature amount acquisition unit 203 can select a feature amount to be used for training of the determiner from a plurality of feature amounts included in intermediate data generated during detection processing. For example, a feature amount for training can be generated using the intermediate feature selected from the plurality of feature amounts in accordance with the setting. The determiner training unit 501 can hold information indicating the thus selected feature amount in the determiner holding unit 207 in association with the determiner obtained by training.

A modification will be described below. In this modification, the target detection unit 202 of the information processing apparatus 50 may send, to the feature amount acquisition unit 203, feature amount information more than that sent by the target detection unit 202 of the information processing apparatus 20. For example, the target detection unit 202 can send the output results of all the intermediate layers of the DNN to the feature amount acquisition unit 203. As another example, the target detection unit 202 can send, to the feature amount acquisition unit 203, the output results of the intermediate layers except for an intermediate layer which is determined in advance not to be used for training. In these cases, the feature amount acquisition unit 203 can use some of the sent output results of the intermediate layers as intermediate features.

A method of setting, by the feature amount acquisition unit 203, a feature amount to be used for training of the determiner will be described in detail. For example, if a multilayer neural network is used as a detector, the feature amount acquisition unit 203 can select an intermediate layer where an intermediate feature is acquired. As a practical example, a pruning method can be used. The pruning method is a method of reducing the weight of the neural network by eliminating neurons that do not contribute to determination at the time of determination using the neural network. For example, a layer where neurons of a predetermined proportion or more are eliminated as a result of sequentially eliminating, by pruning, the neurons of the neural network used as the detector can be excluded from the intermediate layers where intermediate features are acquired.

As another practical example, the determiner training unit 501 can generate a determiner by training using the feature amount selected from the plurality of feature amounts included in the intermediate data generated during the detection processing, and thus generate a plurality of different determiners corresponding to the different feature amounts. Then, the determiner training unit 501 can select a feature amount to be used for training of the determiner based on evaluation of category determination using each of the different determiners generated using the different feature amounts.

For example, the feature amount acquisition unit 203 can generate a feature amount for training using a specific combination of feature amounts (for example, a combination of the output results of the intermediate layers). In this case, the determiner training unit 501 can perform training of the determiner using the feature amount for training based on the specific combination of feature amounts, and evaluate the obtained determiner. By performing this processing for various combinations of feature amounts, the feature amount acquisition unit 203 can select a combination of feature amounts with which a higher evaluation is obtained. More specifically, the feature amount acquisition unit 203 can select an intermediate feature from information which is generated during the detection processing using the detector and is different from the detection information. Evaluation can be performed based on at least one of the accuracy and processing cost (for example, the processing time or necessary memory capacity) of category determination. The feature amount acquisition unit 203 may select a feature amount to be used to generate a feature amount for training from the detection information obtained by the detection processing using the detector. As described above, the feature amount acquisition unit 203 can set selection of a feature amount to be used to perform training of the determiner like the intermediate feature.

If the feature amount acquisition unit 203 sets selection of a feature amount to be used to perform training of the determiner, the determiner training unit 501 can perform training of the determiner using the feature amount for training generated using the selected feature amount. The determiner training unit 501 may send, to the determiner holding unit 207, setting information (for example, information indicating the intermediate layer where an intermediate feature is acquired) indicating the selected feature amount in association with the determiner obtained by training. In this case, in accordance with the setting information associated with the determiner and indicating the selected feature amount, the feature amount acquisition unit 203 of the information processing apparatus 20 can select a feature amount (for example, an intermediate feature such as the output result of the selected intermediate layer) to be used for category determination. Then, the feature amount acquisition unit 203 of the information processing apparatus 20 can generate a feature amount for determination using the selected feature amount, and perform category determination concerning the determination target using the determiner and the generated feature amount for determination.

As described above, since the size of the intermediate feature which is saved in a memory when detecting the determination target can be reduced by selecting a feature amount to be used as an intermediate feature, the memory can be saved.

Note that in this embodiment, after training of the detector is performed, training of the determiner is performed. However, if the DNN is used as the detector, as shown in FIG. 6, and determination is performed using the intermediate feature (the output result of the intermediate layer), training operations of the detector and the determiner can be performed at the same time. For example, if the determiner is a discriminator for discriminating between two classes of normality and abnormality, it is possible to perform training of the detector by returning, to the intermediate layer of the detector, a loss value of a discrimination result with respect to supervisory data. Furthermore, by defining the processing of the feature amount acquisition unit 203 (for example, the processing of the conversion unit 6001 and the feature extraction unit 6002) using the neural network, training operations of the target detection unit 202, the feature amount acquisition unit 203, and the determination unit 204 can be performed at the same time.

Furthermore, in this embodiment, determination is performed using the detection information and the intermediate feature obtained during detecting the determination target. However, the feature amount acquisition unit 203 may acquire an additional feature, and perform category determination for the determination target in consideration of the thus acquired additional feature. For example, if abnormality determination is performed for each frame of a video, difference data between the frames can be used as an additional feature.

As described above, according to this embodiment, the information processing apparatus 20 performs category determination for the determination target using the intermediate feature obtained during detecting the determination target in addition to the detection result of the determination target. Therefore, it is possible to improve the category determination accuracy. In addition, the information processing apparatus 50 can further improve the category determination accuracy by selecting an intermediate feature to be used for category determination from the intermediate data generated during the detection processing. By using the arrangement according to this embodiment, it is possible to perform training of the detector in advance using many images, and select a feature to be used for category determination on the site where category determination is performed.

Second Embodiment

In the second embodiment, category determination is performed by further considering generation information when a sensor such as a camera acquires input data. The generation information is information indicating the generation status of the input data by the sensor, and can include parameters used by the sensor to generate the input data or peripheral environment information when the sensor generates the input data. For example, information of the camera that captures a target image can include the intrinsic or extrinsic parameters of the camera or scene information. The scene information can include peripheral environment information such as illumination conditions or peripheral space information such as a layout. A case in which a feature amount for determination is generated in consideration of the generation information (to be referred to as the image capturing information hereinafter) obtained when the camera captures an image.

According to this embodiment, for example, it is possible to acquire image capturing information on the site where category determination is performed, and generate a feature amount for determination to be used for category determination on the site in accordance with the image capturing information. For example, it is possible to acquire the parameters of a camera that has generated input data as a category determination target and a camera that has generated input data for training. Then, a detection result obtained from the input data as the category determination target can be converted into a detection result obtained when the camera that has generated the input data for training captures the same scene. As another example, it is possible to perform training of an auto-encoder such that the auto-encoder inputted with a feature amount for training obtained at the time of training outputs the feature amount for training, and convert a feature amount for determination obtained at the time of determination using the auto-encoder obtained by training. In these methods, it is possible to perform conversion of making the feature amount for determination close to the feature amount for training, thus improving the accuracy of category determination using the determiner obtained by training.

Figure 3B:
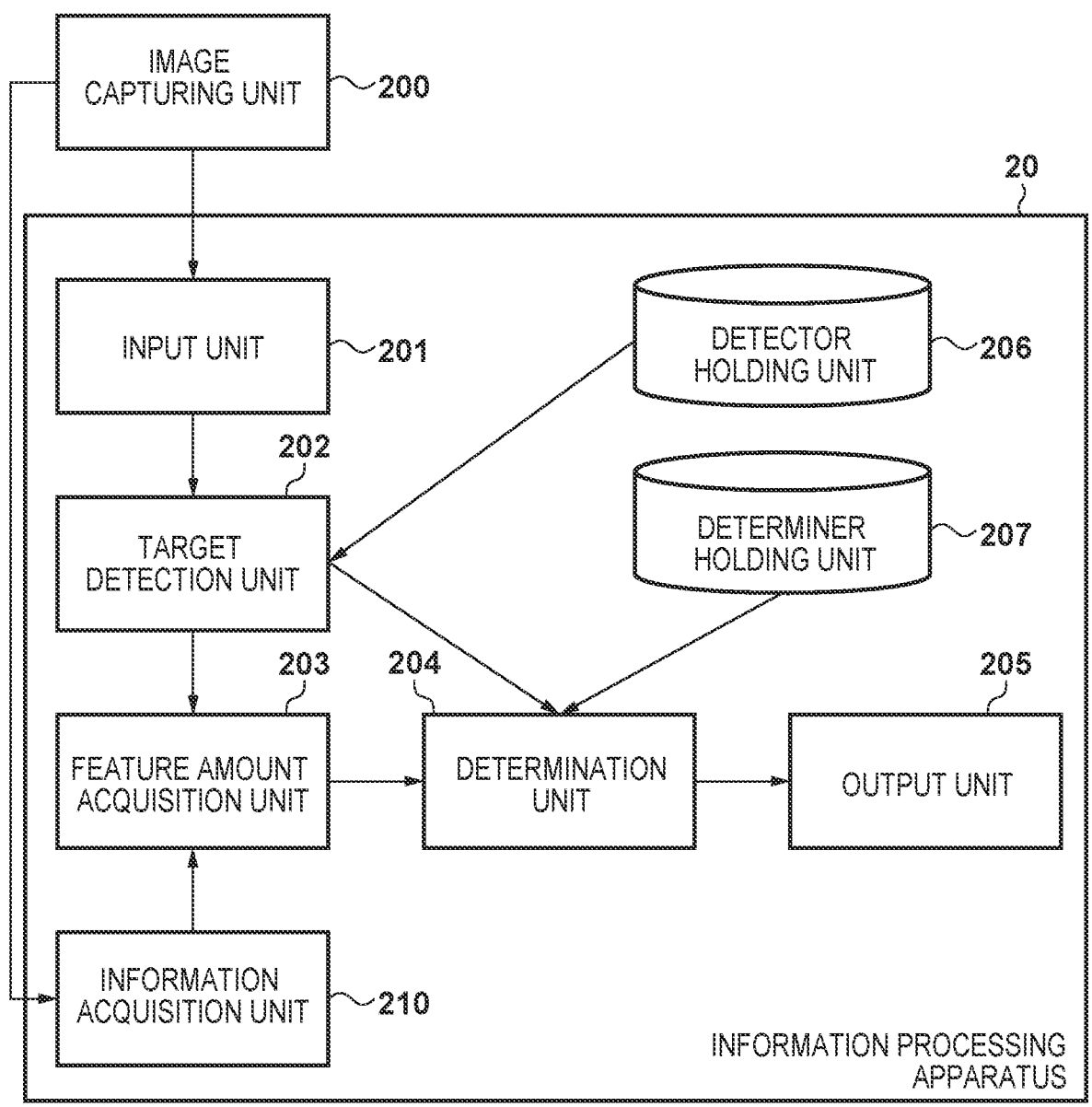

As for examples of the arrangement and processing of an information processing apparatus 20 according to the second embodiment, the difference from the first embodiment will be described. FIG. 3B shows, as functional blocks, processes executed by a CPU 401 of the information processing apparatus 20 according to this embodiment. The information processing apparatus 20 according to this embodiment has almost the same arrangement as in the first embodiment but further includes an information acquisition unit 210.

An information processing method of performing category determination according to the second embodiment can be executed in accordance with the flowchart shown in FIG. 4. In step S301, an input unit 201 acquires a target image 100 as in the first embodiment. Furthermore, the information acquisition unit 210 acquires image capturing information obtained by an image capturing unit 200, and transmits it to a feature amount acquisition unit 203. Step S302 can be performed, similar to the first embodiment.

In step S303, the feature amount acquisition unit 203 generates a feature amount for determination using target information, an intermediate feature, and the image capturing information. For example, the feature amount acquisition unit 203 can convert the target information or the intermediate feature using the image capturing information.

Figure 11:
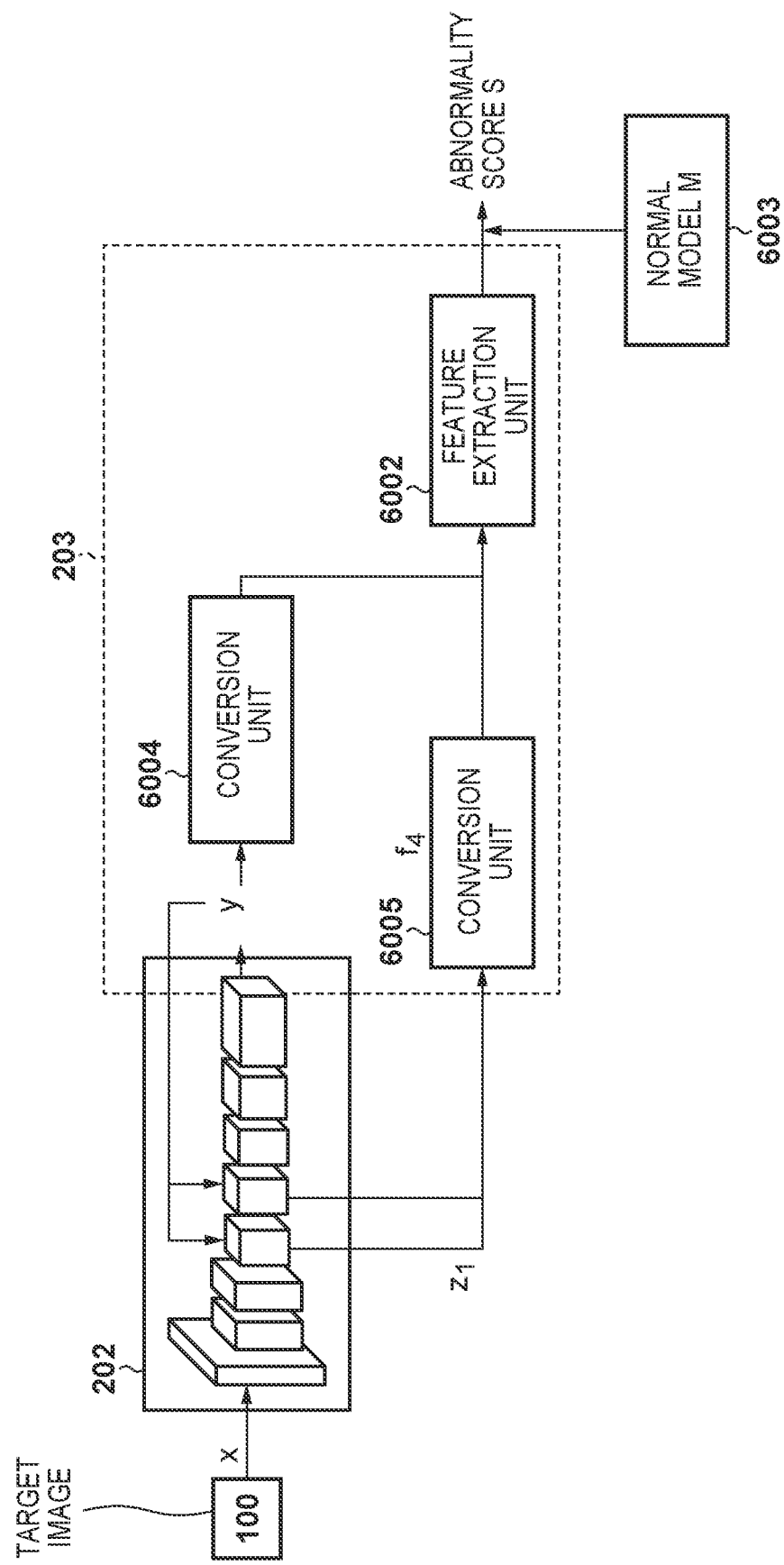
FIG. 11 is a view showing a processing example of category determination processing according to another embodiment.

FIG. 11 shows examples of the arrangement and processing of the feature amount acquisition unit 203. The feature amount acquisition unit 203 includes conversion units 6004 and 6005, and a feature extraction unit 6002 similar to that in the first embodiment. Each of the conversion units 6004 and 6005 can convert a feature amount based on the image capturing information concerning the target image 100. Each of the conversion units 6004 and 6005 can convert a feature based on the image capturing information concerning the camera that has generated the input data for training, which is saved in advance.

For example, the conversion unit 6004 can convert a detection result using the intrinsic and extrinsic parameters of the image capturing unit 200 that has captured the target image. The conversion unit 6004 can additionally define processing $f_4$ for converting a feature. For example, as the processing $f_4$ performed by the conversion unit 6004, an encoder in an auto-encoder can be used. As a practical example, when performing training of a detector and a determiner to be used by the information processing apparatus 20, a feature converter can further be prepared. For example, an auto-encoder that inputs and outputs an intermediate feature used for training of the determiner can be generated by training, and the thus obtained encoder can be used as a feature converter. In this case, using the thus obtained feature converter, the conversion unit 6004 can convert the intermediate feature obtained in step S302.

The processes in steps S304 and S305 are similar to those in the first embodiment and a description thereof will be omitted. According to the above-described embodiment, by converting, using the generation information such as the image capturing information, the feature amount used for category determination, it is possible to reduce the difference between the sensor that has acquired the input data as the determination target and the sensor that has acquired the input data for training. As described above, by performing category determination in consideration of the generation information, it is possible to generate a determiner with high category determination accuracy.

In this embodiment, conversion processing considering the generation information is performed for the obtained feature amount. In another embodiment, conversion processing may be performed for input data (for example, a target image) using generation information.

Third Embodiment

In the third embodiment, a detector detects a part as a portion forming a determination target or a joint as a connecting portion between parts. Then, the determination target is detected based on a detection result. In this case, category determination concerning the determination target can be performed using, as an intermediate feature, the detection result of the portion such as the part or joint in addition to detection information obtained as the detection result of the determination target. Similar to the first embodiment, an example of performing abnormality determination by detecting a determination target in a target image will be described below.

Figure 3C:
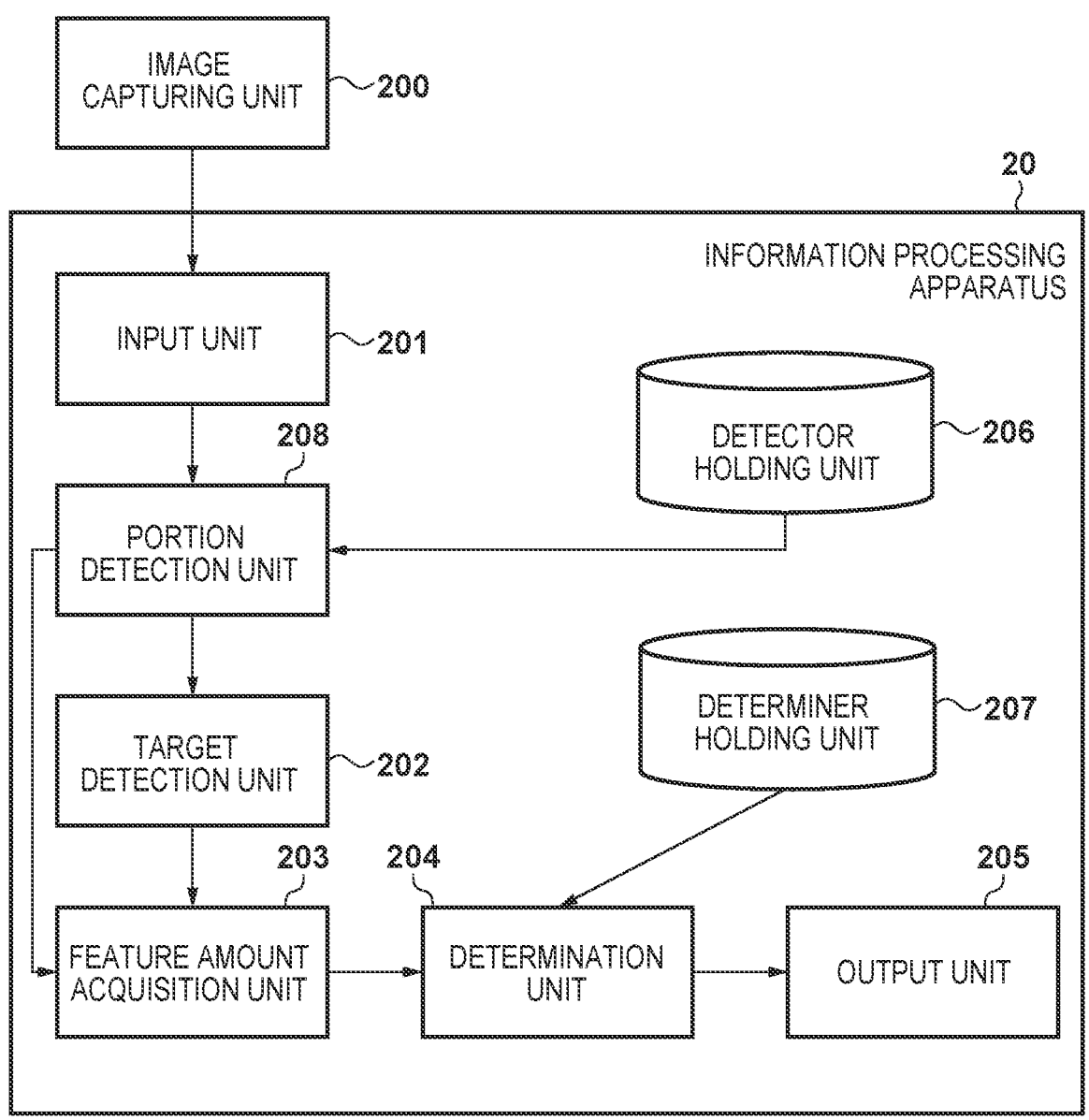

As for examples of the arrangement and processing of an information processing apparatus 20 according to the third embodiment, the difference from the first embodiment will be described. FIG. 3C shows, as functional blocks, processes executed by a CPU 401 of the information processing apparatus 20 according to this embodiment. The information processing apparatus 20 according to this embodiment has almost the same arrangement as in the first embodiment but further includes a portion detection unit 208. In addition, a detector holding unit 206 holds a detector for detecting a portion forming a determination target.

An information processing method of performing category determination according to the third embodiment can be executed in accordance with the flowchart shown in FIG. 4. Step S301 can be performed as in the first embodiment. In step S302, the portion detection unit 208 detects a portion forming a determination target from a target image 100 using the detector held in the detector holding unit 206. For example, the portion detection unit 208 can detect a predetermined joint such as a joint 601 or 602 shown in FIG. 12A or a predetermined part such as a part 604 shown in FIG. 12B. The part may be, for example, an arm, leg, or body of a human. The number of joints or the definition of a part may be set at the time of training or set in accordance with the determination accuracy or processing cost. A setting method and a detector training method will be described later. The portion detection unit 208 transmits a portion detection result such as a joint or part to a target detection unit 202 and a feature amount acquisition unit 203. The portion detection unit 208 transmits intermediate data generated during the portion detection processing to the feature amount acquisition unit 203.

As a method of detecting a joint, a method disclosed in non-patent literature 3 ("Stacked Hourglass Networks for Human Pose Estimation", Alejandro Newell, Kaiyu Yang, Jia Deng, arxiv 2016) can be used. For example, by estimating a heat map 605 for each joint, and performing peak detection or threshold processing on the heat map, it is possible to obtain a position 606 of the joint and a score corresponding to this position. As a method of detecting a part, a method disclosed in non-patent literature 4 ("A Discriminatively Trained, Multiscale, Deformable Part Model", Pedro Felzenswalb, David McAllester, Deva Ramanan, IEEE Conference on Computer Vision Pattern Recognition 2008) can be used.

In step S302, the target detection unit 202 detects a determination target based on the portion detection result obtained by the portion detection unit 208. For example, as shown in FIG. 12A, the target detection unit 202 can select each joint forming a person using the detection result of each joint, and detect a determination target based on the selected joint. Alternatively, as shown in FIG. 12B, the target detection unit 202 can detect a determination target using the detection result of the part. The target detection unit 202 transmits, as detection information concerning the thus detected determination target, information indicating the position and size of a human body region 603 as a detection result to the feature amount acquisition unit 203.

In step S303, using an intermediate feature and the detection information of the determination target obtained in step S302, the feature amount acquisition unit 203 generates a feature amount for determination to be used for determination. In this embodiment, the intermediate feature includes the detection result of the portion such as a joint or part. The intermediate feature may include intermediate data generated during portion detection by the portion detection unit 208. The information can be said to be intermediate data different from the detection information.

FIG. 13 shows an example of the input/output relationship between processing units, similar to FIG. 6. The feature amount acquisition unit 203 includes a conversion units 6007, 6008 and a feature extraction unit 6009. Processing executed by the portion detection unit 208, which has been described above, is represented as processing $f_5$. A portion detection result {y} is obtained by this processing for an input image x, given by:

$$\{y\}=f_5(x) \quad (11)$$

This portion detection result is obtained for each of the detected portions, and a portion detection result may be obtained for a plurality of portions.

The processing of the conversion unit 6007 is similar to that in the first embodiment. That is, the conversion unit 6007 can obtain a feature amount y' after conversion by performing conversion processing for a detection result y of the determination target generated by the target detection unit 202 based on the portion detection result {y}. Furthermore, a conversion unit 6008 can obtain a feature amount {y}' after conversion by performing conversion processing of the portion detection result {y}. The processing executed by the conversion unit 6008 can also be defined, similar to the processing executed by the conversion unit 6007.

The processing of the feature extraction unit 6009 is represented as processing $f_8$, and obtains a feature amount $z_2$ for determination based on the feature amounts y' and {y}' after conversion and an intermediate feature $z_1$ similar to that in the first embodiment, given by:

$$z_2=f_8(\{y\}'+z_1+y') \quad (12)$$

The thus obtained feature amount $z_2$ for determination is transmitted to a determination unit 204.

Figure 14:
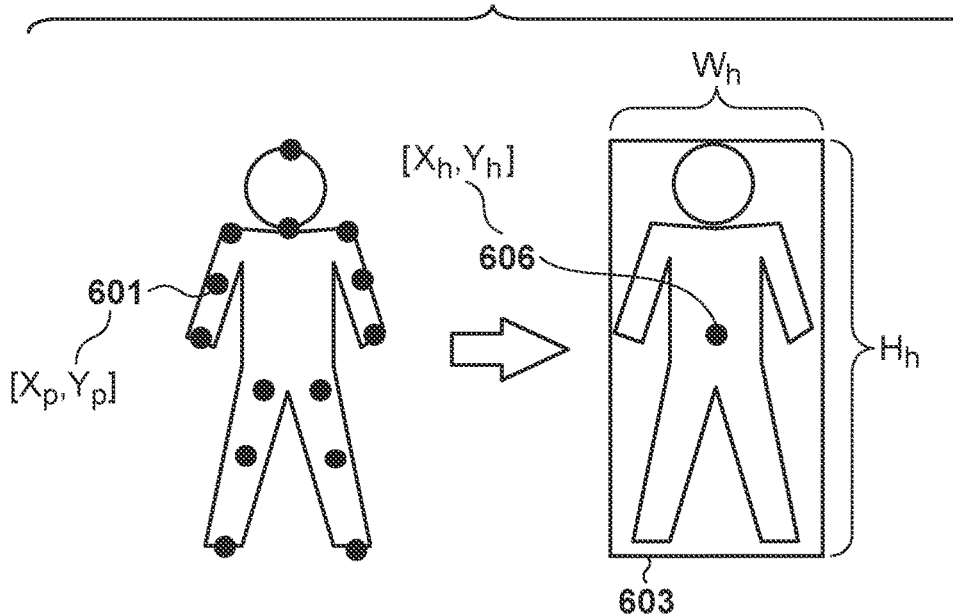
FIG. 14 is a view showing a processing example of feature amount generation processing according to the embodiment.

An example of the processing ($f_8$) of generating a feature amount for determination will be described in more detail below. FIG. 14 shows the human body region 603 as the detection result of each portion (the joint 601 in this example) and the detection result of the determination target. The detection result of the portion can be represented by coordinates ($X_p$, $Y_p$) where p represents the index of the joint. For example, if the human body is defined by 17 joints, p has a value of 1 to 17. Furthermore, as for the human body region 603 as the detection result of the determination target, the size of a bounding box surrounding the human body can be represented by ($W_h$, $H_h$) and the center coordinates ($X_h$, $Y_h$). In this case, conversion processing given by equations (13) and (14) below can be performed for the detection result of each portion using the detection result of the determination target. It is possible to obtain the feature amount $z_2$ for determination using the feature amount after conversion and also using a method similar to that in the first embodiment, as needed.

$$X_p'=(X_p-X_h)/W_h \quad (13)$$

$$Y_p'=(Y_p-Y_h)/H_h \quad (14)$$

Processes in steps S304 and S305 are similar to those in the first embodiment and a description thereof will be omitted. By this method, the information processing apparatus 20 can perform category determination concerning the detected determination target.

Examples of the arrangement and processing of an information processing apparatus 50, that performs training of the detector and the determiner used in the information processing apparatus 20 according to this embodiment, will be described next. The information processing apparatus 50 according to this embodiment has almost the same arrangement as in the first embodiment but further includes a portion detection unit 208 similar to that of the information processing apparatus 20. Detector training processing will be described below in accordance with the flowchart shown in FIG. 10A.

In step S351, an input unit 201 transmits training data held in a training data holding unit 502 to a detector training unit 503, similar to the first embodiment. Supervisory data included in the training data can include position and size information of the determination target in the first embodiment but can include information indicating the definition of each portion and its position in this embodiment. For example, if a joint is detected as a portion, the supervisory data can indicate the definition of the joint and its position. If a part is detected as a portion, the supervisory data can indicate the definition of each part and its position and size.

In step S352, the detector training unit 503 performs training of the detector using the training data transmitted in step S351. The detector obtained by training is a portion detector for detecting a portion. A practical example of a training method is the method disclosed in non-patent literature 3. As a practical example, it is possible to perform training of the detector for detecting a joint by giving, as supervisory data, a heat map with a peak at the position of a joint. Alternatively, it is possible to perform training of the detector for discriminating a part by using an image feature amount for each part. The detector training unit 503 transmits the obtained detector to the detector holding unit 206. By this method, it is possible to perform training of the detector.

Determiner training processing will be described next in accordance with the flowchart shown in FIG. 10B. Processing in step S361 is similar to that in the first embodiment. Processing in step S362 is similar to step S302, and the detection result of a portion is obtained using the detector obtained by training and the detection result of a determination target is also obtained. Processing in step S363 is similar to step S303, and a feature amount for training is generated using the detection result of the determination target and the intermediate feature. Processing in step S364 is similar to that in the first embodiment, and training of the determiner is performed based on the feature amount for training. Note that similar to the first embodiment, the feature amount acquisition unit 203 may select a feature amount to be used for training of the determiner.

As describe above, according to this embodiment, in addition to the detection information of the target, detection information of the portion is used as intermediate feature for category determination. Therefore, it is possible to improve the category determination accuracy.

Fourth Embodiment

In the fourth embodiment, processing parameters in category determination using a determiner are selected from a plurality of parameters. The selected processing parameters are held in a determiner holding unit 207 in association with the determiner obtained by training. In this embodiment, the determiner obtained by the training processing according to each of the first to third embodiments can be evaluated using evaluation data. Then, processing parameters to be used for category determination processing are set based on an evaluation result. Category determination can be evaluated based on at least one of the accuracy and processing cost of category determination. For example, category determination accuracy for the evaluation data and a processing amount required for category determination can be set, and processing parameters to be used for target detection processing or determination processing can be set to satisfy the set values. Examples of the processing parameters will be described later. According to this embodiment, it is possible to obtain a determiner with high accuracy or high-speed processing. An example of performing abnormality determination for a determination target detected from input data will be described below.

In addition to the determination processing using the determiner, the category determination processing includes processing performed for the determination processing, for example, processing of detecting a determination target and processing of generating a feature amount for determination. The evaluation data can include, for example, input data, information of the determination target indicated in the input data, and information representing the category of the determination target. As the evaluation data, data which has a structure similar to that of the training data for training of the determiner used in each of the first to third embodiments and is different from the training data can be used.

Figure 9B:
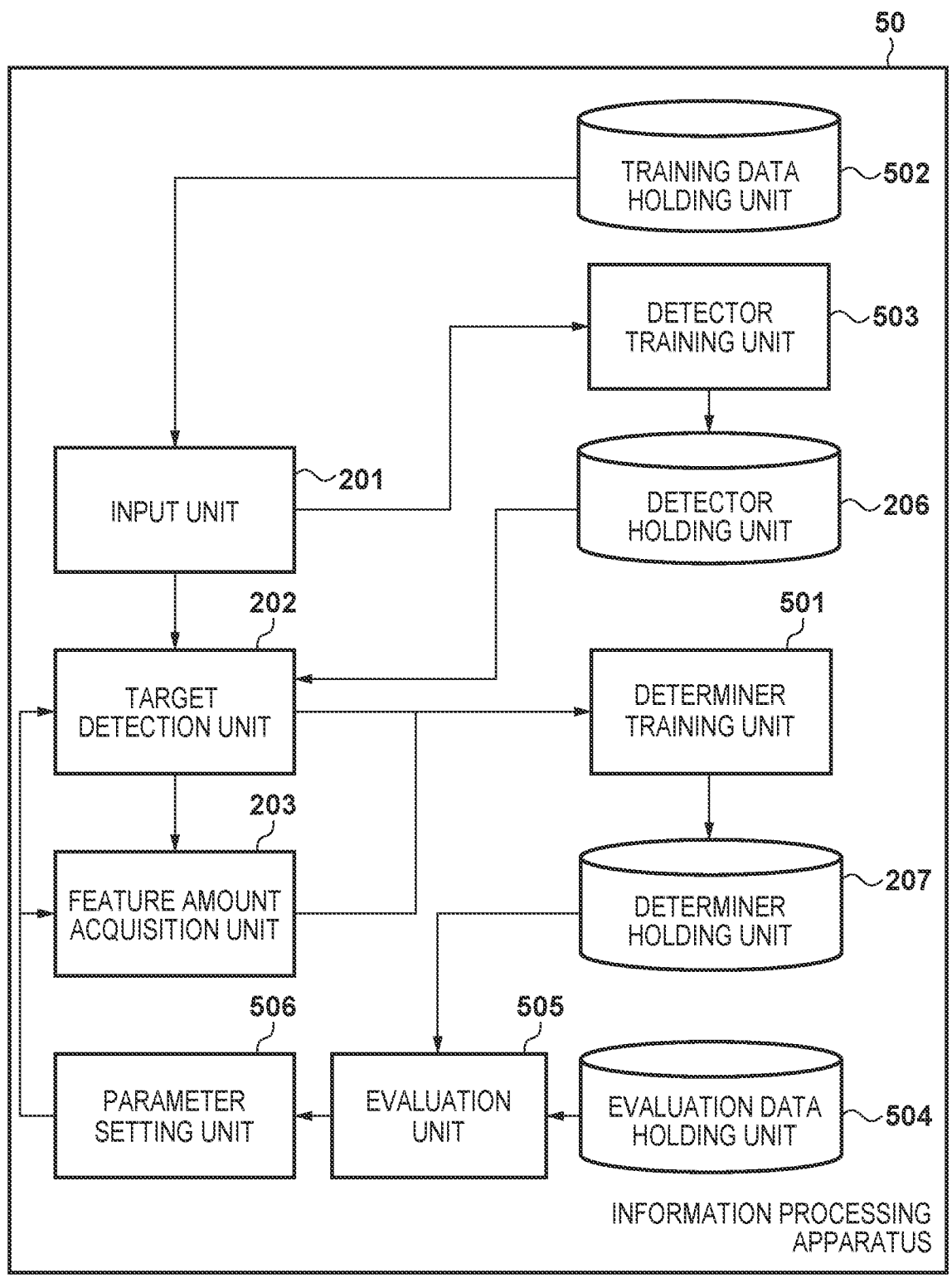

A category determination method according to the fourth embodiment is similar to that according to each of the first to third embodiments and a description thereof will be omitted. Examples of the arrangement and processing of an information processing apparatus 50 for performing training of the determiner will be described below. FIG. 9B shows, as functional blocks, processes executed by the CPU 401 of the information processing apparatus 50 according to this embodiment. The information processing apparatus 50 according to this embodiment has almost the same arrangement as in the first embodiment but includes an evaluation data holding unit 504, an evaluation unit 505, and a parameter setting unit 506. Note that the evaluation data holding unit 504 may be, for example, an HD 404, or a nonvolatile storage device connected to an information processing apparatus 20.

Training of a detector can be performed in accordance with the flowchart shown in FIG. 10A, as in each of the first to third embodiments. Training of a determiner will be described below in accordance with the flowchart shown in FIG. 10B. Steps S361 to S364 are similar to those in each of the first to third embodiments and a description thereof will be omitted. In the fourth embodiment, additional evaluation step and setting step are performed after step S364. In the evaluation step, the evaluation unit 505 can evaluate the determiner after training obtained in step S364. For example, the evaluation unit 505 can evaluate at least one of the accuracy and processing cost of the determiner. The evaluation unit 505 can also evaluate the detector obtained according to the flowchart shown in FIG. 10A or obtained in advance. An example in which the evaluation unit 505 evaluates the accuracies and processing costs of the determiner and detector will be described below.

In the setting step succeeding the evaluation step, the parameter setting unit 506 sets, based on evaluation in the evaluation step, processing parameters to be used for the category determination processing. The parameter setting unit 506 can set processing parameters to be used by, for example, a target detection unit 202, a feature amount acquisition unit 203, a determination unit 204, or the like. Examples of the parameters are the size of the input data, a threshold used at the time of target detection, the type of an intermediate feature used for determination, and a threshold used at the time of determination.

Figure 15:
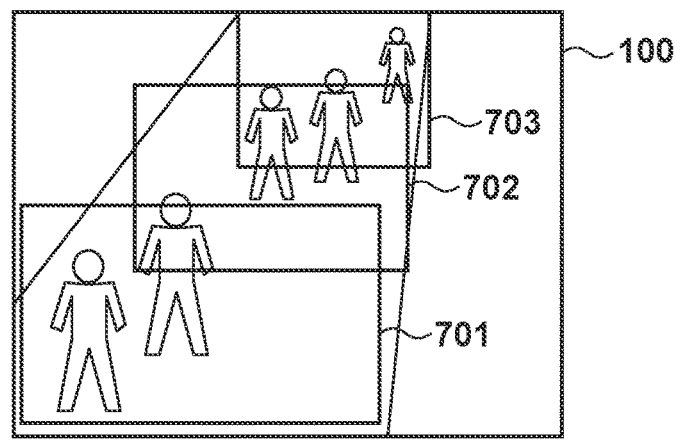
FIG. 15 is a view for explaining an example of parameter setting according to still another embodiment.

As an example, in the category determination processing, it is possible to improve the accuracy of determination target detection and category determination by setting a target image of a given size as a target. To achieve this, if, as shown in FIG. 15, a plurality of processing ranges 701, 702, and 703 are set as category determination targets in a target image 100, it is possible to crop and resize a processing image in each processing range, as needed. More specifically, by performing reduction processing for the image in the processing range 701 and enlargement processing for the image in the processing range 703 so as to equalize the sizes of the processing images, the sizes of these images can be made close to the image size in the processing range 702. Determination target detection and category determination can be performed for the processing images after size adjustment. In this example, the parameter setting unit 506 can set an enlargement or reduction ratio in accordance with the evaluation result (for example, the accuracies and processing times of determination target detection and category determination) by the evaluation unit 505.

Figure 16:
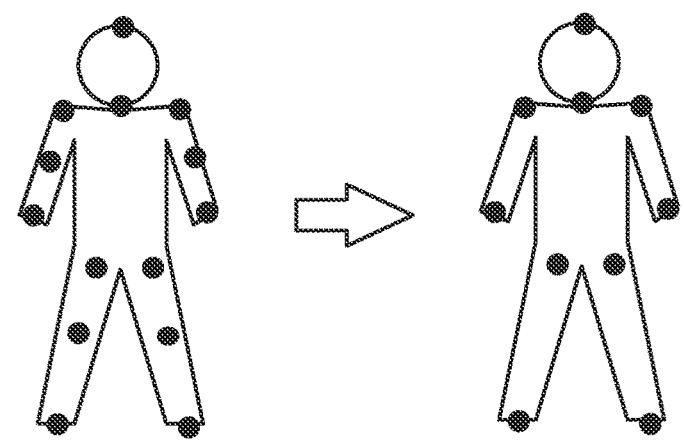
FIG. 16 is a view for explaining the example of parameter setting according to the embodiment.

As another example, the parameter setting unit 506 may set, in accordance with the evaluation result, the number of portions to be detected, as shown in FIG. 16, in an arrangement of detecting a determination target based on the detection result of a portion (for example, a joint) as in the third embodiment. With this arrangement, it is possible to suppress the processing time and the memory consumption at the time of processing by reducing the number of portions to be detected while maintaining the category determination accuracy at a given level.

As a further example, a detector holding unit 206 can hold a plurality of detectors, and the determiner holding unit 207 can hold a plurality of determiners respectively corresponding to the detectors. In this arrangement, the parameter setting unit 506 may set, as a detector and a determiner to be used for the category determination processing, a suitable combination of a detector and a determiner in accordance with the evaluation result.

As described above, the information processing apparatus 50 according to this embodiment can evaluate the determiner obtained by training and the like, and set, based on the evaluation result, parameters to be used for the category determination processing. These processes can improve the category determination accuracy. Note that the parameter setting unit may set parameters also based on the above-described generation information such as spatial information of a scene as a determination target and the extrinsic and intrinsic parameters of an image capturing unit 200 for capturing the target image 100.

Fifth Embodiment

An information processing apparatus 50 according to the fifth embodiment improves the accuracy of category determination processing of performing category determination for a determination target based on the feedback of the user. In the fifth embodiment, evaluation data as sequence data including a plurality of data is input to the information processing apparatus 50. The sequence data is, for example, temporal video data or sound data sequentially input, and one data unit (for example, a frame or a sound interval) is related to preceding and succeeding data units. In other words, if abnormality is determined for one data unit, abnormality is highly probably determined for preceding and succeeding data units.

The information processing apparatus 50 according to this embodiment sequentially performs category determination processing for the data units forming the sequence data. If information obtained in the category determination processing changes or changes by exceeding a threshold, the information processing apparatus 50 obtains the feedback of the user. If the information obtained in the category determination processing changes, for example, if a determination result changes from abnormality to normality, a characteristic change highly probably occurs in the data unit. Therefore, it is possible to improve the determination accuracy by adjusting the category determination processing based on the user feedback indicating whether the information obtained in the category determination processing is correct.

That is, the information processing apparatus 50 according to this embodiment selects evaluation target data from a plurality of data units forming evaluation data as sequence data. Then, the information processing apparatus 50 presents, to the user, information obtained in the category determination processing for the selected evaluation target data, and obtains user feedback to the presented information.

This embodiment can be used in combination with each of the first to fourth embodiments. For example, the information processing apparatus 50 can obtain user feedback indicating whether the detection result of the determination target and the category determination result, which have been obtained in the category determination processing for the frame image as evaluation target data, are correct. The set of the feedback and evaluation target data can be used as training data or evaluation data described in each of the first to fourth embodiments. For example, the information processing apparatus 50 can adjust the parameters to be used for the category determination processing, similar to the fourth embodiment, based on the user feedback. In addition, the information processing apparatus 50 can perform retraining of the detector or the determiner based on the user feedback.

According to this embodiment, it is possible to improve the accuracy of the category determination processing based on the user feedback. With this arrangement, it is possible to improve the accuracy of the category determination processing based on evaluation data obtained in the actual installation location of a sensor such as an image capturing unit 200. That is, according to this embodiment, it is possible to adjust the category determination processing in accordance with the use status on the site where category determination is performed according to each of the first to fourth embodiments.

Note that the information obtained in the category determination processing is not limited to the result of the category determination processing, and can include all data obtained as a result of the processes performed in the category determination processing. For example, in the arrangement according to the first embodiment, the information obtained in the category determination processing can include the position and size of the determination target obtained in the determination target detection processing for the evaluation target data, and the score obtained in category determination of the determination target. The information obtained in the category determination processing may include the feature amount acquired during processing, such as the intermediate feature.

Figure 9C:
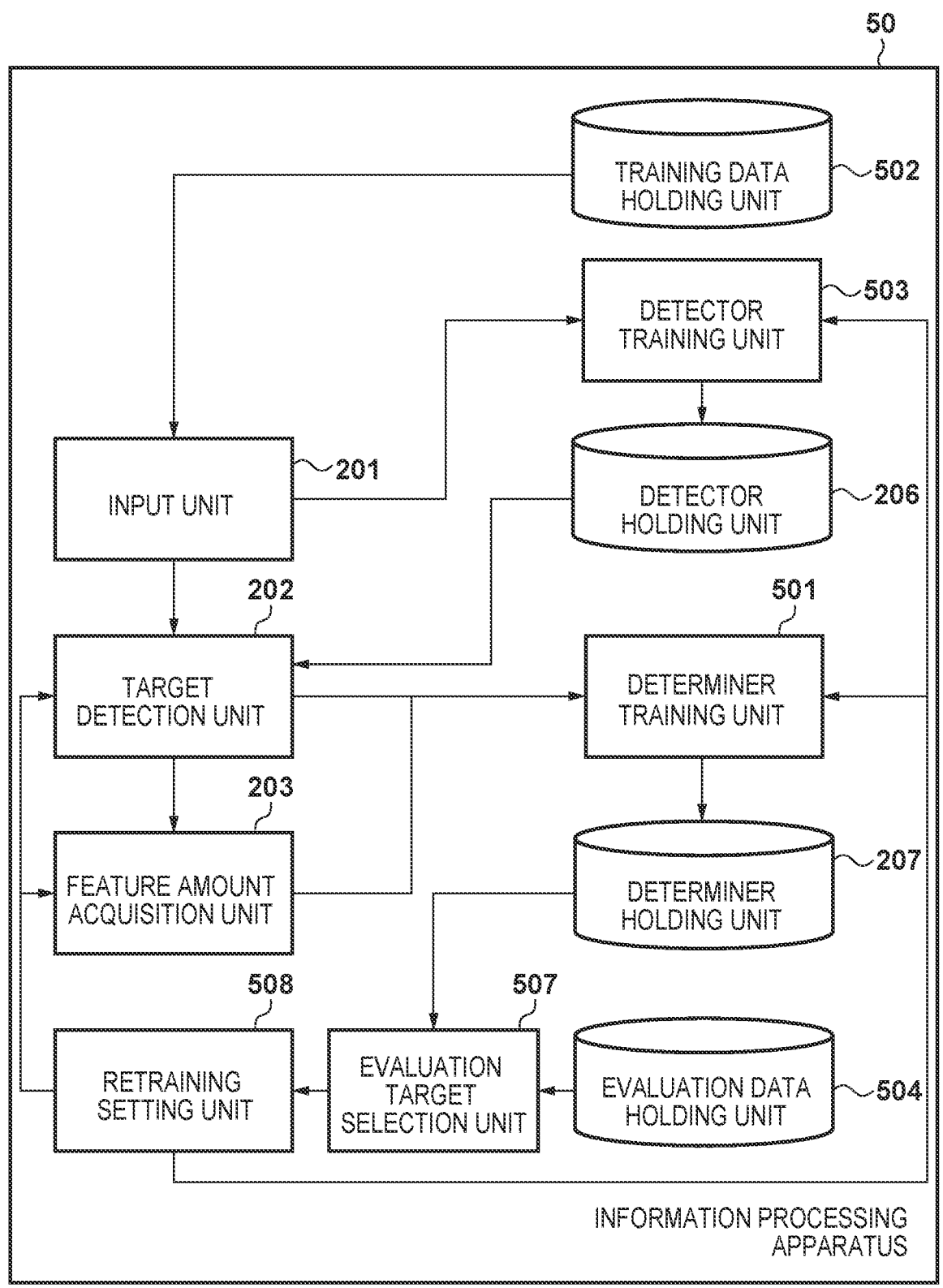

Examples of the arrangement and processing of the information processing apparatus 50 according to the fifth embodiment will be described below. FIG. 9C shows, as functional blocks, processes executed by a CPU 401 of the information processing apparatus 50 according to this embodiment. The information processing apparatus 50 according to this embodiment has almost the same arrangement as in the fourth embodiment but includes an evaluation target selection unit 507 and a retraining setting unit 508. An example of performing abnormality determination for a determination target detected from input data will be described below.

Figure 10C:
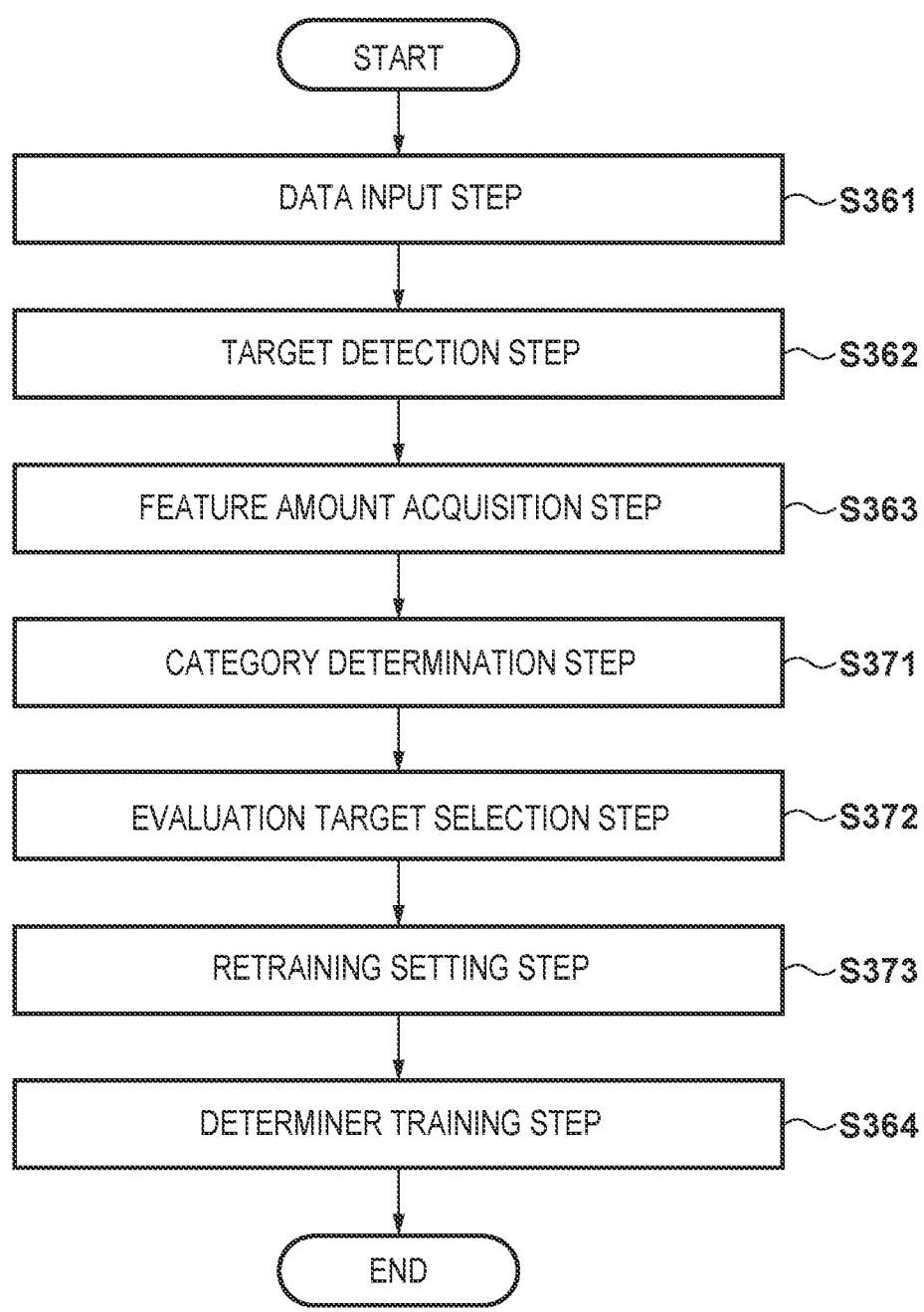

Processing according to this embodiment can be performed in accordance with the flowchart shown in FIG. 10C which shows the determiner training method according to each of the first to fourth embodiments. Note that processing when a detector is already obtained as a result of, for example, performing the processing according to FIG. 10A by the information processing apparatus 50 will be described below. However, a detector may be generated by training using evaluation data with a similar method. A case in which a determiner is already obtained and retraining of the determiner is performed using evaluation data will be describe below. However, a determiner may be generated by training using evaluation data by a similar method.

In step S361, a feature amount acquisition unit 203 acquires, as input data, one data item (for example, one frame) from evaluation data (for example, video data) as sequence data held in an evaluation data holding unit 504. The feature amount acquisition unit 203 can sequentially acquire data items along a sequence (for example, a time series). The following processing can be repeated every time the feature amount acquisition unit 203 acquires one input data.

Processes in steps S362 and S363 are similar to those in the first embodiment. That is, a determination target is detected from the input data using the detector. Then, a feature amount for determination is generated using the detection result of the determination target and an intermediate feature.

In step S371, the evaluation target selection unit 507 performs processing similar to that of the determination unit 204 in step S304 according to the first embodiment. That is, the evaluation target selection unit 507 performs category determination for the determination target using a determiner obtained in advance and held in a determiner holding unit 207, detection information, and the intermediate feature. In this embodiment, the evaluation target selection unit 507 performs category determination for the determination target detected from the input data using the feature amount for determination obtained in step S363.

In step S372, the evaluation target selection unit 507 determines whether the input data being currently processed is selected as an evaluation target to undergo evaluation determination by the user. The evaluation target selection unit 507 detects a change in information obtained in the processing of detecting the determination target from the data and performing category determination while sequentially performing processing for the plurality of data included in the sequence data. For example, the evaluation target selection unit 507 can determine the difference between the information obtained in category determination processing for the input data being currently processed and information obtained in category determination processing for another input data (for example, input data processed immediately before). An item for which the difference is determined is not particularly limited, and may be the detection result of the determination target, the determination result, at least part of the intermediate feature, or a combination thereof. If the determined difference exceeds a preset threshold, the evaluation target selection unit 507 can select, as data to be presented to the user, the input data being currently processed.

If the input data being currently processed is not selected as an evaluation target, the evaluation target selection unit 507 does not acquire feedback from the user or perform retraining using the input data being currently processed in step S371. On the other hand, if the evaluation target selection unit 507 selects, as an evaluation target, the input data being currently processed, the process advances to a retraining setting step.

In step S373, the retraining setting unit 508 acquires feedback from the user with respect to the information of the determination target or the category determination result for the data from which a change has been detected. For example, the retraining setting unit 508 can present, to the user via a display unit 406, the input data being currently processed and the detection result of the determination target or the category determination result for the input data. Then, the retraining setting unit 508 acquires user feedback to the detection result of the determination target or the category determination result via, for example, an operation unit 405.

Figure 17A:
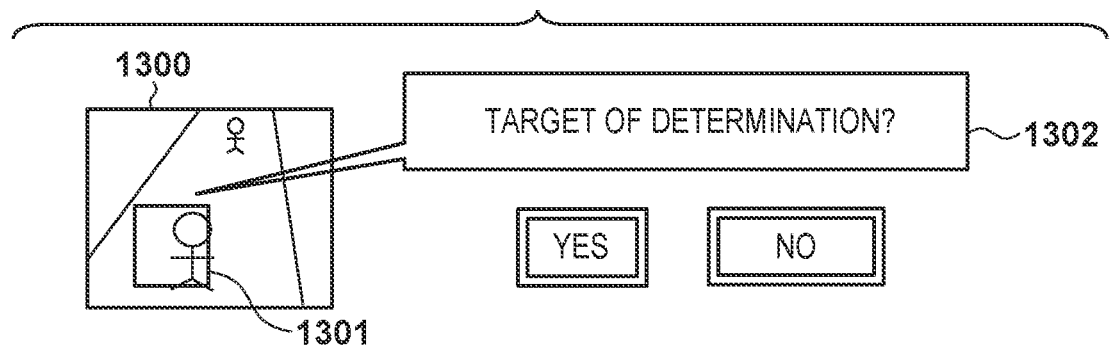
FIGS. 17A to 17C are views each showing an example of a user interface according to still another embodiment.
Figure 17B:
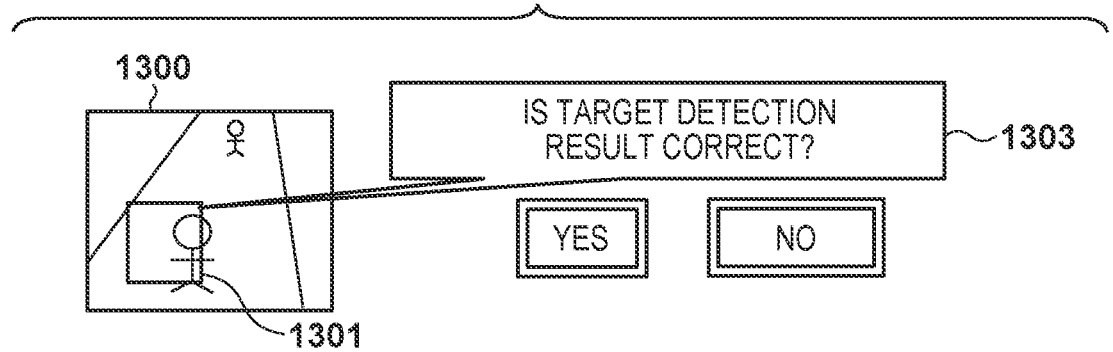
Figure 17C:
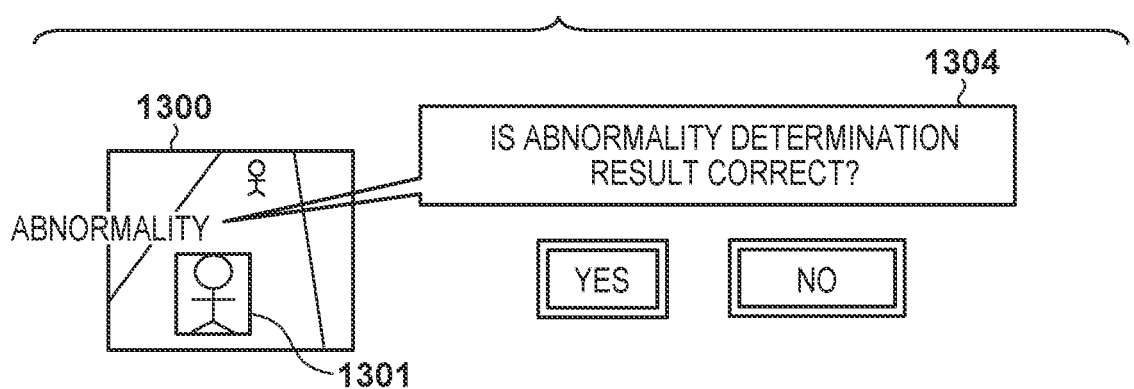
Figure 18:
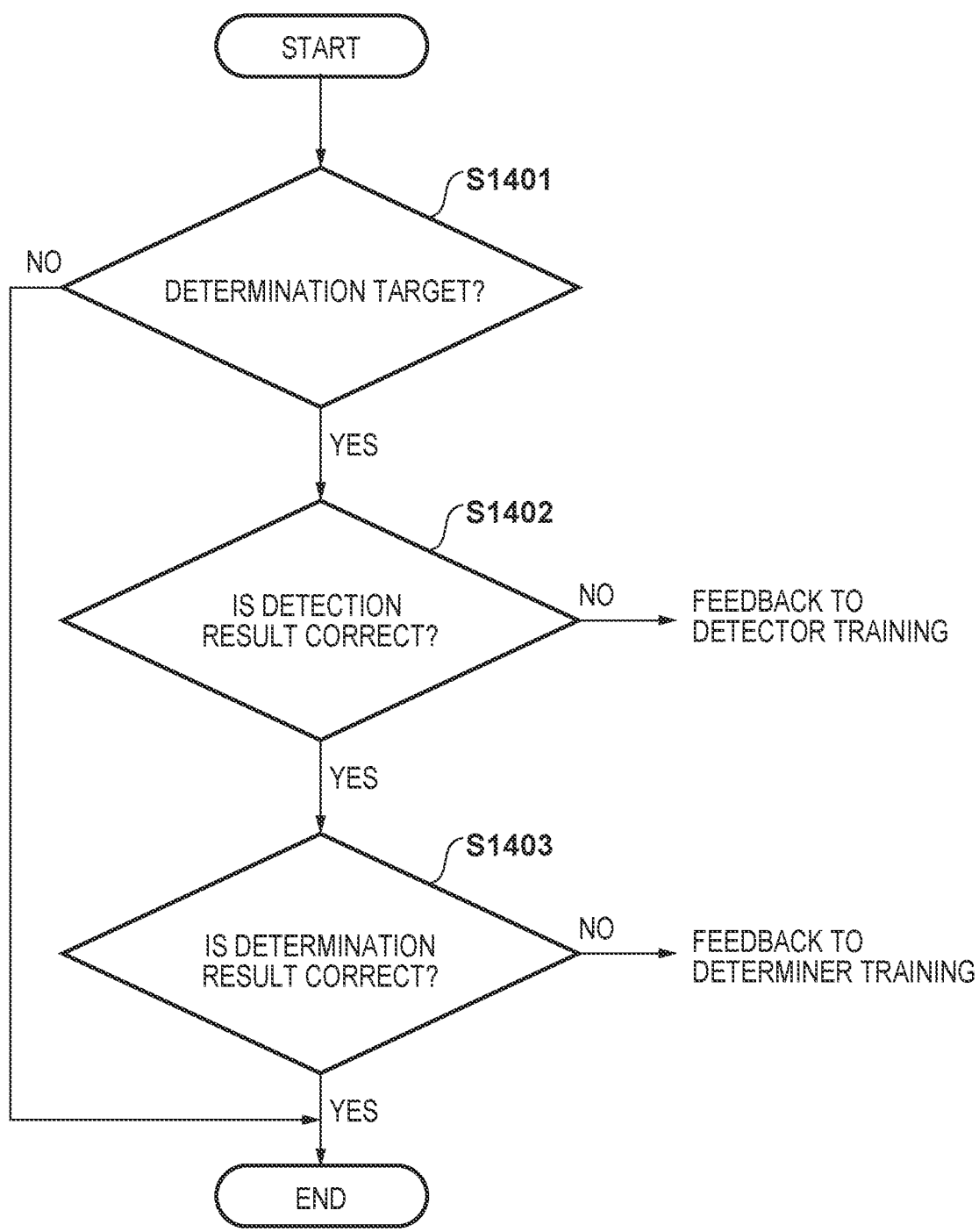
FIG. 18 is a flowchart illustrating an example of processing of acquiring feedback.

FIGS. 17A to 17C each show an example of a UI for acquiring feedback from the user in the retraining setting step. FIG. 18 is a flowchart illustrating an example of processing of acquiring feedback from the user by the retraining setting unit 508. As shown in FIG. 17A, in step S1401, the retraining setting unit 508 superimposes information indicating a detection result 1301 of a determination target on a target image 1300 as input data, and presents it to the user. The retraining setting unit 508 presents, to the user, a prompt 1302 for inquiring whether to perform user determination for the detection result 1301, and acquires an input from the user. If the user selects "YES", the process advances to step S1402. If the user selects "NO", the detection result 1301 is excluded from evaluation targets, and retraining using the input data being currently processed in step S371 is not performed.

In step S1402, the retraining setting unit 508 presents, to the user, a prompt 1303 for inquiring whether the detection result 1301 presented to the user is correct. Since the detection result 1301 is an actual detection result, a region of a determination target indicated by the detection result 1301 may shift from a region of an actual determination target (human body), as shown in FIG. 17B. The detection result 1301 may indicate a region other than the determination target. In this case, the user can select "NO". In this case, the retraining setting unit 508 can acquire information indicating the correct position and size of the determination target from the user. The thus acquired information can be used as supervisory data for the input data. That is, a detector training unit 503 can perform retraining of the detector in step S364 using training data including the input data and supervisory data.

If, in step S1402, the user selects "YES", the process advances to step S1403. In step S1403, the retraining setting unit 508 superimposes information indicating a category determination result on the target image 1300 as the input data, and presents it to the user. As shown in FIG. 17C, the retraining setting unit 508 presents, to the user, a prompt 1304 for inquiring whether the category determination result presented to the user is correct. If the use selects "YES", retraining using the input data being currently processed in step S364 is not performed. On the other hand, if the user selects "NO", the retraining setting unit 508 can acquire information indicating the correct category of the determination target from the user. The thus acquired information can be used as supervisory data for the input data. That is, a determiner training unit 501 can perform retraining of the determiner in step S364 using training data including the input data and supervisory data.

Steps S362 to S373 can be repeated every time the feature amount acquisition unit 203 acquires one input data. Then, after processing for all the evaluation data ends, the determiner training unit 501 or the detector training unit 503 can perform, in step S364, training of the determiner again using the feedback and the data from which a change has been detected. In this embodiment, the determiner training unit 501 and the detector training unit 503 can perform retraining of the determiner and detector using the training data newly obtained in the retraining setting step. For example, the determiner training unit 501 and the detector training unit 503 add newly obtained training data to the existing training data, and perform training using both the data, thereby obtaining the determiner and detector after retraining. The determiner training unit 501 and the detector training unit 503 may perform retraining using all the evaluation targets, or perform retraining using some evaluation targets sampled by some method. In this embodiment, since it is possible to acquire supervisory data for the input data based on the feedback from the user, it is not necessary to generate supervisory data for the evaluation data in advance.

As described above, according to this embodiment, the information processing apparatus 50 performs the category determination processing for the sequence data, and selects, from the sequence data, data as an evaluation target by the user based on the data obtained in the determination processing. Then, the category determination processing is adjusted based on user feedback indicating evaluation. According to this embodiment, it is possible to improve the accuracy of the category determination processing while suppressing a load on the user.

Sixth Embodiment

In the sixth embodiment, a method of detecting a determination target to be used for category determination using a determiner is selected from a plurality of detection methods. In this embodiment, using the detection method selected from the plurality of detection methods, a determination target is detected from input data and category determination for the detected determination target is performed. With the arrangement according to this embodiment, a different detection method can be used for each determination target, and it is thus possible to improve the category determination accuracy. For example, a plurality of detectors are prepared in advance, and a detector to be used for detection can be selected in accordance with a determination target.

If input data is image data, a detection method may be selected in accordance with a position in the image, at which a determination target is to be detected. For example, if a corridor as a space long in the depth direction or the like is captured from above, it is often difficult to recognize the detailed operation or posture of a person on the far side. In this example, by using a detector for detecting a determination target such as a human body, as in the first embodiment, in a region corresponding to the far side and using a detector for detecting a determination target portion, as in the third embodiment, in a region corresponding to the near side, it is possible to detect a determination target in accordance with a detection result. With this arrangement, it is possible to perform category determination with high robustness, in which the determination target detection accuracy is improved and the category determination accuracy does not lower even in the region corresponding to the far side.

Figure 3D:
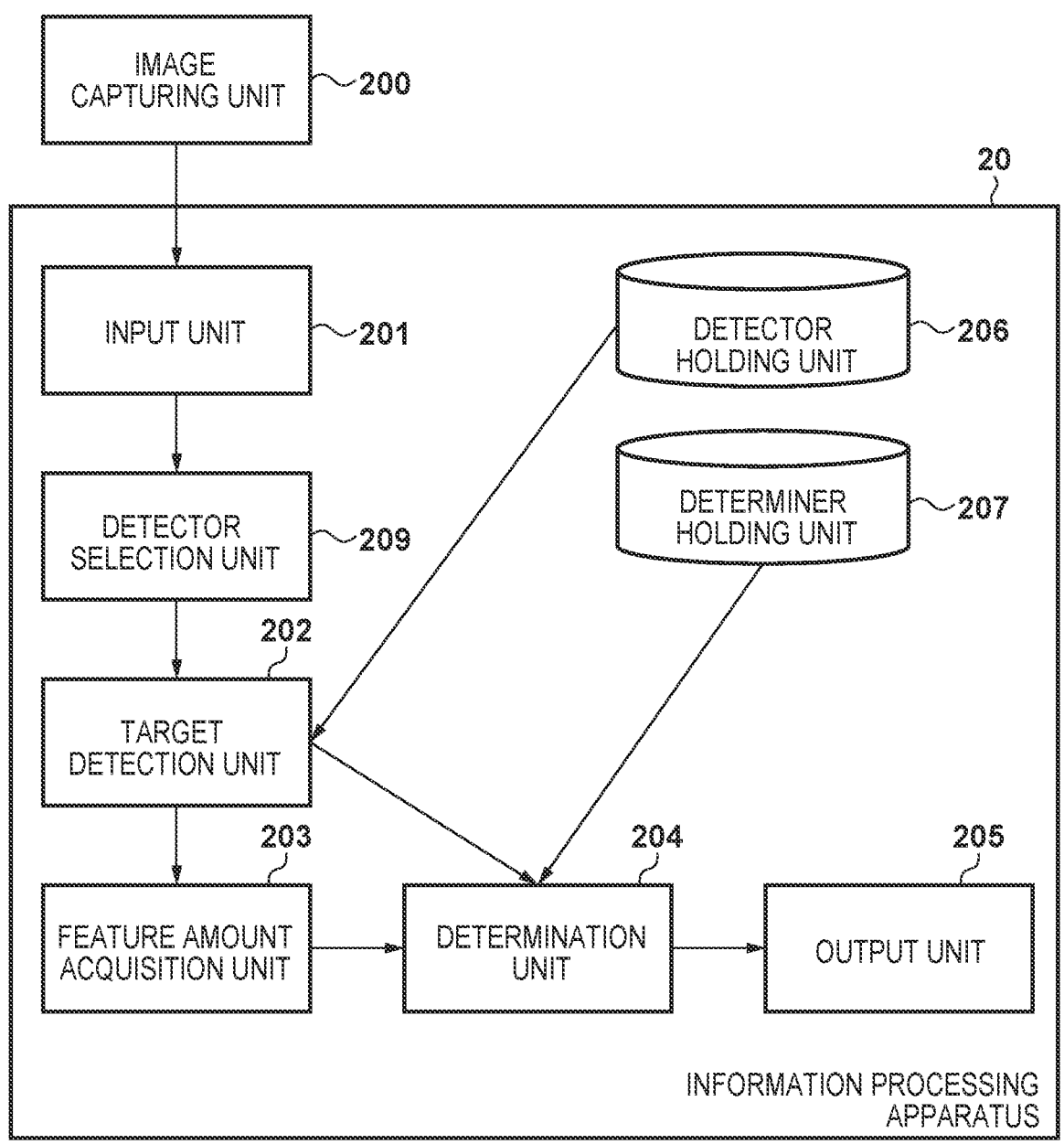

Examples of the arrangement and processing of an information processing apparatus 20 according to the sixth embodiment will be described below. FIG. 3D shows, as functional blocks, processes executed by a CPU 401 of the information processing apparatus 20 according to this embodiment. The information processing apparatus 20 according to this embodiment has almost the same arrangement as in the first embodiment but further includes a detector selection unit 209. An example of performing abnormality determination for a determination target detected from input data will be described below.

Category determination processing according to this embodiment can be performed in accordance with the flowchart shown in FIG. 4. Processing in step S301 is similar to that in each of the first to fourth embodiments and a description thereof will be omitted. In step S302, the detector selection unit 209 selects a detector based on input data acquired in step S301. For example, the detector selection unit 209 can select a predetermined detector in accordance with a position (for example, a position on an image) on the data. As another example, the detector selection unit 209 may select a detector in accordance with generation information of the input data, for example, image capturing information such as a camera installation position, time, environment information, or image capturing parameters. In this case, an input unit 201 may further acquire the generation information in step S301.

Then, a target detection unit 202 detects a determination target from the input data using the detector selected by the detector selection unit 209. As another example, after detecting a determination target from the input data using each of a plurality of detectors, the detection result of the detection target may be selected in accordance with, for example, a position on the image. A typical processing method is similar to that in each of the first to fourth embodiments. Processes in steps S303 to S305 can be performed as in each of the first to fourth embodiments. On the other hand, in step S303, the determination unit 204 may use a determiner corresponding to the detector selected by the detector selection unit 209. As described above, the category determination processing for the input data can be performed.

Figure 9D:
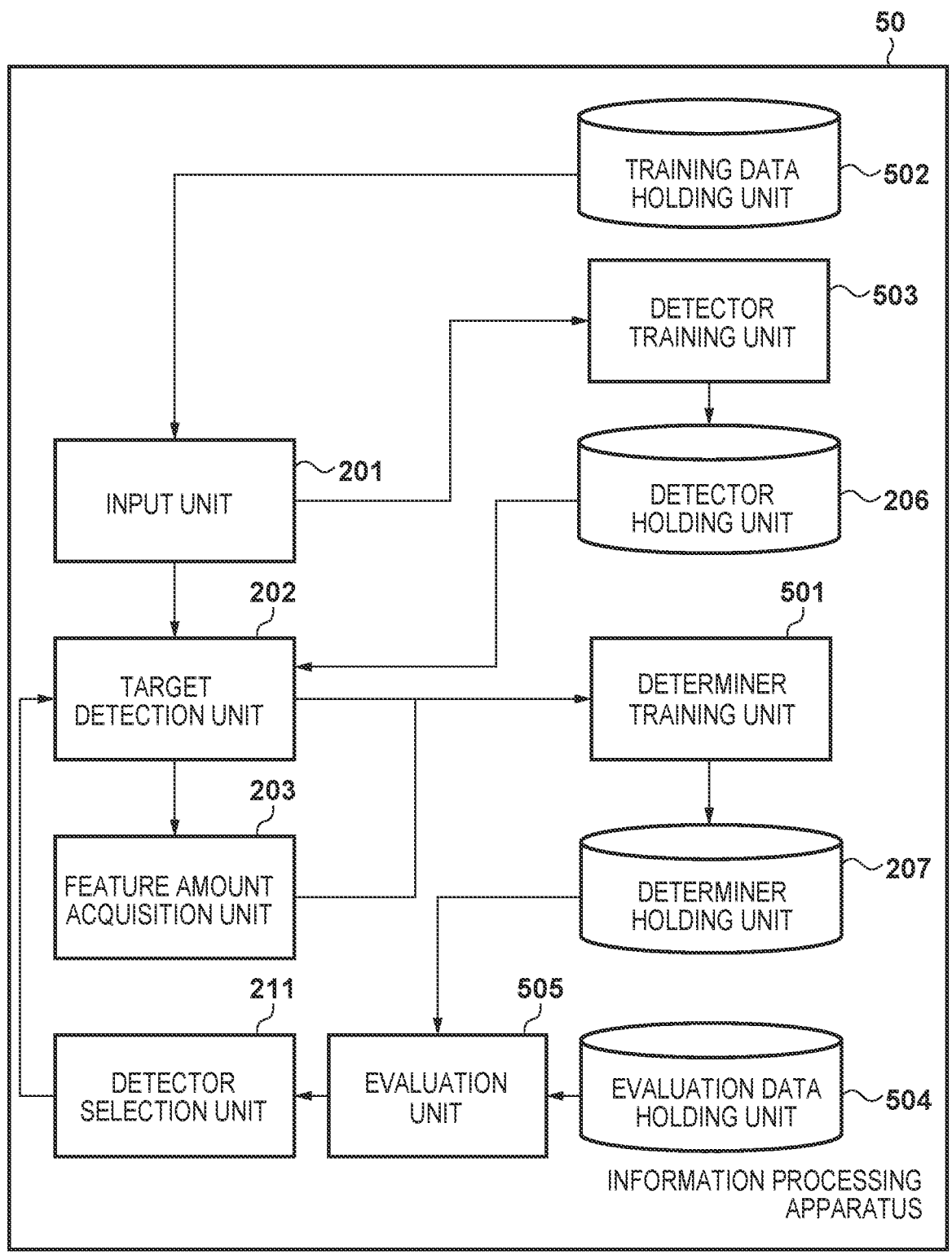

Examples of the arrangement and processing of an information processing apparatus 50 for generating, by training, a detector and determiner to be used by the information processing apparatus 20 according to this embodiment will be described next. The information processing apparatus 50 according to this embodiment can further set a detector selection method. FIG. 9D shows, as functional blocks, processes executed by a CPU 401 of the information processing apparatus 50 according to this embodiment. The information processing apparatus 50 according to this embodiment has almost the same arrangement as in the second embodiment but includes a detector selection unit 211 instead of the parameter setting unit 506.

A detector according to this embodiment can be obtained by training processing similar to that in each of the first to fourth embodiments. In this embodiment, a plurality of detectors are prepared. For example, the respective detectors can be generated by training using different training data. As another example, the respective detectors may detect different portions of a determination target. In addition, a determiner according to this embodiment can be obtained by training processing similar to that according to each of the first to fourth embodiments. In this embodiment, however, determiners corresponding to the respective detectors can be prepared. For example, it is possible to perform training of a determiner by selecting a detector from the plurality of detectors of the information processing apparatus 50.

Furthermore, the information processing apparatus 50 can select, from a plurality of detection methods, a method of detecting a determination target to be used for category determination using a determiner, and hold information indicating the selected detection method in a detector holding unit 206 in association with a determiner obtained by training. In this way, the information processing apparatus 50 can preset a detector selection method by the detector selection unit 209. For example, similar to the fourth embodiment, an evaluation unit 505 can evaluate each of the plurality of detectors and its corresponding determiner using evaluation data held in an evaluation data holding unit 504. Then, the detector selection unit 211 can set a detector selection method by the detector selection unit 209 based on an evaluation result by the evaluation unit 505. Category determination can be evaluated as in the fourth embodiment.

For example, the detector selection unit 211 can associate the detector with generation information (for example, image capturing information of a camera that has acquired input data included in the evaluation data) of the evaluation data. As a practical example, the detector selection unit 211 can associate, with the generation information of the evaluation data, a detector for which highest evaluation is obtained in evaluation using the evaluation data. The detector for which highest evaluation is obtained may be a detector with the highest determination accuracy or a detector with the highest score which is determined in accordance with the determination accuracy and the processing speed. As another example, the detector selection unit 211 may associate a position on an image, at which the determination target is detected, with the detector for which highest evaluation is obtained in category determination concerning the determination target. In accordance with this association, the detector selection unit 211 can select a detector corresponding to the position of a target region where generation information or a determination target is to be detected. The detector selection unit 211 can store the association information in, for example, the detector holding unit 206.

According to this embodiment, the information processing apparatus 20 can select, from a plurality of detectors, a detector which improves the category determination accuracy. Furthermore, the information processing apparatus 50 can evaluate a plurality of detectors and a plurality of determiners obtained by training, and set a detector selection method by the information processing apparatus 20 based on an evaluation result. By this method, category determination with high discrimination accuracy can be implemented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-015982, filed Jan. 31, 2019, which is hereby incorporated by reference herein in its entirety.

What is claimed is:

1. An information processing apparatus comprising one or more processors and one or more memories storing one or more programs which cause the one or more processors to perform:
    acquiring sequence data including a plurality of data;
    detecting a determination target from the data;
    performing training of a determiner for performing category determination concerning the determination target using information of the determination target detected from the data and intermediate data being generated during detecting the determination target and being different from the information of the determination target; and
    performing the category determination concerning the determination target detected from the data using the determiner for performing the category determination concerning the determination target, the information of the determination target detected from the data, and intermediate data being generated during detecting the detection target and being different from the information of the determination target,
    wherein performing the training includes:
        detecting a change in information obtained by detecting the determination target from the data and performing the category determination, while sequentially performing the category determination for the plurality of data;
        acquiring, from a user, feedback to a result of the category determination or the information of the determination target, for the data from which the change has been detected; and
        performing the training of the determiner again using the feedback and the data from which the change has been detected.

2. The information processing apparatus according to claim 1, wherein the training includes selecting, from a plurality of feature amounts included in the intermediate data, a feature amount to be used for the training of the determiner, and holding information indicating the selected feature amount in a storage in association with the determiner resulting from the training.

3. The information processing apparatus according to claim 2, wherein the training includes generating a determiner by training using the feature amount selected from the plurality of feature amounts included in the intermediate data, and selecting a feature amount to be used for the training of the determiner based on evaluation of category determination using different determiners respectively generated using different feature amounts.

4. The information processing apparatus according to claim 3, wherein the evaluation of the category determination is performed based on at least one of accuracy of the category determination or a processing cost of the category determination.

5. The information processing apparatus according to claim 1, wherein the training includes selecting, from a plurality of parameters, a processing parameter in the category determination using the determiner, and holding the selected processing parameter in a storage in association with the determiner resulting from the training.

6. The information processing apparatus according to claim 1, wherein the training includes selecting, from a plurality of detection methods, a detection method of the determination target to be used for the category determination using the determiner, and holding information indicating the selected detection method in a storage in association with the determiner resulting from the training.

7. The information processing apparatus according to claim 1, wherein the training includes generating a feature amount for training using the information of the determination target and the intermediate data, and performing the training of the determiner using the feature amount for training.

8. The information processing apparatus according to claim 7, wherein the training includes generating the feature amount for training further using information indicating how the data acquired by the acquisition unit was generated.

9. The information processing apparatus according to claim 1, wherein the category determination concerning the determination target determines whether the determination target is abnormal.

10. The information processing apparatus according to claim 1, wherein the data is data obtained by a sensor.

11. The information processing apparatus according to claim 1, wherein the information of the determination target is information indicating one of a position or a size of the determination target.

12. The information processing apparatus according to claim 1, wherein the detecting includes detecting the determination target using a neural network, and
the intermediate data includes an output from an intermediate layer of the neural network.

13. The information processing apparatus according to claim 1, wherein the detecting includes detecting a portion which constitutes the determination target from the data, and detecting the determination target based on a detection result of the portion, and
the intermediate data includes the detection result of the portion.

14. An information processing apparatus comprising one or more first processors and one or more first memories storing one or more first programs which cause the one or more first processors to perform:
acquiring data;
detecting a determination target from the data; and
performing category determination concerning the determination target using information of the determination target detected from the data, intermediate data being generated during detecting the determination target and being different from the information of the determination target, and performing, by a determiner, category determination concerning the determination target,
wherein the determiner is obtained by training by a training apparatus comprising one or more second processors and one or more second memories storing one or more second programs which cause the one or more second processors to perform:
acquiring sequence data including a plurality of data;
detecting a determination target from the data; and
performing training of the determiner for performing category determination concerning the determination target using information of the determination target detected from the data by the training apparatus and intermediate data being generated during detection the determination target by the training apparatus and being different from the information of the determination target, and
wherein performing the training includes:
detecting a change in information obtained by detecting the determination target from the data and performing the category determination, while sequentially performing the category determination for the plurality of data;
acquiring, from a user, feedback to a result of the category determination or the information of the determination target, for the data from which the change has been detected; and
performing the training of the determiner again using the feedback and the data from which the change has been detected.

15. An information processing method comprising:
acquiring sequence data including a plurality of data;
detecting a determination target from the data;
performing training of a determiner for performing category determination concerning the determination target using information of the determination target detected from the data and intermediate data being generated during detecting the determination target and being different from the information of the determination target;
performing the category determination concerning the determination target detected from the data using the determiner for performing the category determination concerning the determination target, the information of the determination target detected from the data, and intermediate data being generated during detecting the detection target and being different from the information of the determination target,
wherein performing the training includes:
detecting a change in information obtained by detecting the determination target from the data and performing the category determination, while sequentially performing the category determination for the plurality of data;
acquiring, from a user, feedback to a result of the category determination or the information of the determination target, for the data from which the change has been detected; and
performing the training of the determiner again using the feedback and the data from which the change has been detected.

16. An information processing method comprising:
acquiring data;
detecting a determination target from the data; and
performing category determination concerning the determination target using information of the determination target detected from the data, intermediate data being generated during detecting the determination target and being different from the information of the determination target, and a determiner for performing the category determination concerning the determination target, wherein the determiner is obtained by training by a training apparatus comprising one or more second processors and one or more second memories storing one or more second programs which cause the one or more second processors to perform:
  acquiring sequence data including a plurality of data;
  detecting a determination target from the data; and
  performing training of a determiner for performing the category determination concerning the determination target using the information of the determination target detected from the data by the training apparatus and intermediate data being generated during detection the determination target by the training apparatus and being different from the information of the determination target, and
wherein performing the training includes:
  detecting a change in information obtained by detecting the determination target from the data and performing the category determination, while sequentially performing the category determination for the plurality of data;
  acquiring, from a user, feedback to a result of the category determination or the information of the determination target, for the data from which the change has been detected; and
  performing the training of the determiner again using the feedback and the data from which the change has been detected.

17. A non-transitory computer-readable medium storing a program which, when executed by a computer comprising a processor and a memory, causes the computer to perform:
  acquiring sequence data including a plurality of data;
  detecting a determination target from the data;
  performing training of a determiner for performing category determination concerning the determination target using information of the determination target detected from the data and intermediate data being generated during detecting the determination target and being different from the information of the determination target; and
  performing the category determination concerning the determination target detected from the data using the determiner for performing the category determination concerning the determination target, the information of the determination target detected from the data, and intermediate data being generated during detecting the detection target and being different from the information of the determination target,
wherein performing the training includes:
  detecting a change in information obtained by detecting the determination target from the data and performing the category determination, while sequentially performing the category determination for the plurality of data;
  acquiring, from a user, feedback to a result of the category determination or the information of the determination target, for the data from which the change has been detected; and
  performing the training of the determiner again using the feedback and the data from which the change has been detected.

* * * * *